(12) United States Patent
Hirao

(10) Patent No.: US 12,420,644 B2
(45) Date of Patent: Sep. 23, 2025

(54) INFORMATION PROCESSING APPARATUS, INFORMATION PROCESSING METHOD, AND PROGRAM

(71) Applicant: Sony Group Corporation, Tokyo (JP)

(72) Inventor: Toshihiro Hirao, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 344 days.

(21) Appl. No.: 18/044,209

(22) PCT Filed: Sep. 3, 2021

(86) PCT No.: PCT/JP2021/032450
§ 371 (c)(1),
(2) Date: Mar. 7, 2023

(87) PCT Pub. No.: WO2022/059522
PCT Pub. Date: Mar. 24, 2022

(65) Prior Publication Data
US 2023/0356603 A1    Nov. 9, 2023

(30) Foreign Application Priority Data
Sep. 18, 2020  (JP) ................. 2020-157243

(51) Int. Cl.
*B60L 15/20* (2006.01)
*G10K 15/04* (2006.01)

(52) U.S. Cl.
CPC ......... *B60L 15/20* (2013.01); *B60L 2240/421* (2013.01); *B60L 2240/423* (2013.01);
(Continued)

(58) Field of Classification Search
None
See application file for complete search history.

(56) References Cited

U.S. PATENT DOCUMENTS

2008/0060861 A1* 3/2008 Baur ................. B60K 1/00
  180/65.6
2008/0236912 A1* 10/2008 Ueoka ............... B60K 6/445
  180/65.265

FOREIGN PATENT DOCUMENTS

JP   2002-142304 A   5/2002
JP   2006-193002 A   7/2006
(Continued)

OTHER PUBLICATIONS

International Search Report and Written Opinion mailed on Nov. 16, 2021, received for PCT Application PCT/JP2021/032450, filed on Sep. 3, 2021, 9 pages including English Translation.

*Primary Examiner* — Hitesh Patel
*Assistant Examiner* — Wenyuan Yang
(74) *Attorney, Agent, or Firm* — XSENSUS LLP

(57) ABSTRACT

An information processing apparatus includes a parameter calculation unit that calculates, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source; a parameter setting unit that sets a second parameter related to the non-internal combustion engine on the basis of the first parameter; and a drive control unit that controls the non-internal combustion engine on the basis of the second parameter. The present technology can be applied to, for example, a system for controlling an electric vehicle.

17 Claims, 9 Drawing Sheets

(52) U.S. Cl.
CPC ... *B60L 2240/441* (2013.01); *B60L 2240/443* (2013.01); *B60L 2250/28* (2013.01); *G10K 15/04* (2013.01)

(56) References Cited

FOREIGN PATENT DOCUMENTS

| | | | |
|---|---|---|---|
| JP | 2011-215437 | A | 10/2011 |
| JP | 2018-36494 | A | 3/2018 |
| JP | 2020-68549 | A | 4/2020 |

\* cited by examiner

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2021/032450, filed Sep. 3, 2021, which claims priority to JP 2020-157243, filed Sep. 18, 2020, the entire contents of each are incorporated herein by reference.

TECHNICAL FIELD

The present technology relates to an information processing apparatus, an information processing method, and a program, and more particularly, to an information processing apparatus, an information processing method, and a program suitable for use in a case of simulating a characteristic of a vehicle using an internal combustion engine as a power source in a vehicle using a non-internal combustion engine as a power source.

BACKGROUND ART

In recent years, a market for an electric vehicle using an electric motor as a power source, which is a non-internal combustion engine, has been expanding. Since the electric motor can increase torque even at a low rotation, the electric vehicle does not need to have a multistage transmission mechanism, and is particularly attractive to a user who prefers a seamless and powerful acceleration feeling. On the other hand, for a user who prefers a traveling feeling of a vehicle using an internal combustion engine as a power source (hereinafter referred to as an internal combustion engine vehicle) such as a conventional engine and the like, there is a possibility that a degree of satisfaction with the electric vehicle decreases.

Whereas, conventionally, there has been proposed a technology of increasing and decreasing an engine sound flowing into a vehicle interior according to a vehicle interior sound that has collected a sound in the vehicle interior and a state of a vehicle (see, for example, Patent Document 1).

CITATION LIST

Patent Document

Patent Document 1: Japanese Patent Application Laid-Open No. 2006-193002

SUMMARY OF THE INVENTION

Problems to be Solved by the Invention

For example, by applying the technology described in Patent Document 1 to an electric vehicle, it is possible to provide an electric vehicle that can be driven while feeling an engine sound for a user who prefers a traveling feeling of an internal combustion engine vehicle. However, in the technology described in Patent Document 1, only the engine sound can be simulated, and thus, it is assumed that a degree of satisfaction of such a user is limited.

The present technology has been made in view of such a situation, and improves a degree of satisfaction of a user who prefers a traveling feeling of an internal combustion engine vehicle with a vehicle using a non-internal combustion engine as a power source (hereinafter referred to as a non-internal combustion engine vehicle) such as an electric vehicle and the like.

Solutions to Problems

An information processing apparatus according to one aspect of the present technology includes: a parameter calculation unit that calculates, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source; a parameter setting unit that sets a second parameter related to the non-internal combustion engine on the basis of the first parameter; and a drive control unit that controls the non-internal combustion engine on the basis of the second parameter.

An information processing method according to one aspect of the present technology includes: calculating, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source; setting a second parameter related to the non-internal combustion engine on the basis of the first parameter; and controlling the non-internal combustion engine on the basis of the second parameter.

A program according to one aspect of the present technology causes a computer to execute processing of: calculating, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source; setting a second parameter related to the non-internal combustion engine on the basis of the first parameter; and
   controlling the non-internal combustion engine on the basis of the second parameter.

In one aspect of the present technology, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source is calculated, a second parameter related to the non-internal combustion engine is set on the basis of the first parameter, and the non-internal combustion engine is controlled on the basis of the second parameter.

MODE FOR CARRYING OUT THE INVENTION

Hereinafter, a mode for carrying out the present technology will be described. Note that the description will be given in the following order.

1. Configuration Example of Vehicle Control System
2. Embodiment
3. Modifications
4. Others

1. Configuration Example of Vehicle Control System

Figure 1:
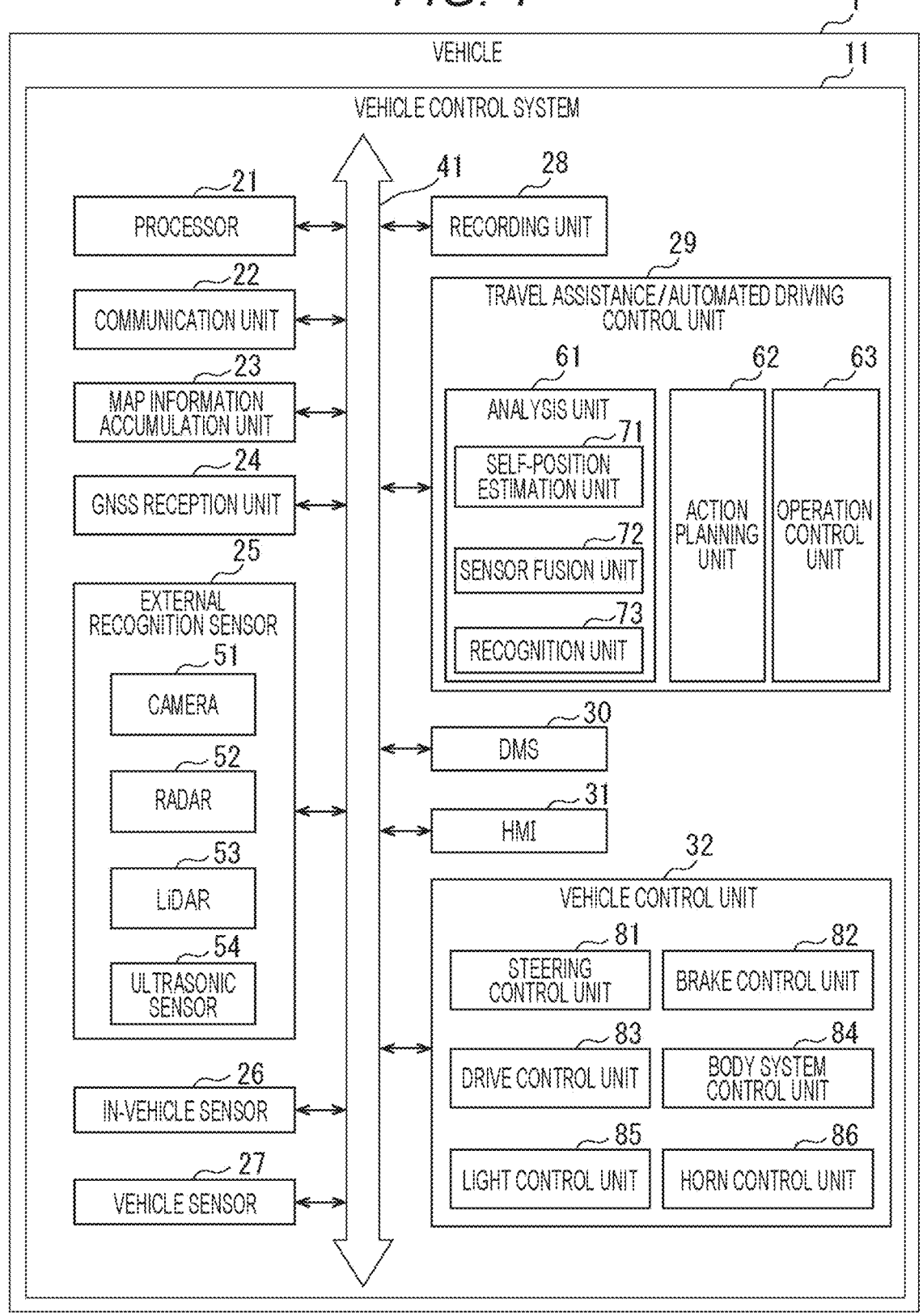
FIG. 1 is a block diagram illustrating a configuration example of a vehicle control system.

FIG. 1 is a block diagram illustrating a configuration example of a vehicle control system 11 which is an example of a mobile device control system to which the present technology is applied.

The vehicle control system 11 is provided in a vehicle 1 and performs processing related to travel assistance and automated driving of the vehicle 1.

The vehicle control system 11 includes a processor 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automated driving control unit 29, a driver monitoring system (DMS) 30, a human machine interface (HMI) 31, and a vehicle control unit 32.

The processor 21, the communication unit 22, the map information accumulation unit 23, the GNSS reception unit 24, the external recognition sensor 25, the in-vehicle sensor 26, the vehicle sensor 27, the recording unit 28, the travel assistance/automated driving control unit 29, the driver monitoring system (DMS) 30, the human machine interface (HMI) 31, and the vehicle control unit 32 are connected to one another via a communication network 41. The communication network 41 includes, for example, a vehicle-mounted communication network, a bus, and the like conforming to any standard such as a controller area network (CAN), a local interconnect network (LIN), a local area network (LAN), FlexRay (registered trademark), Ethernet, and the like. Note that there is also a case where each unit of the vehicle control system 11 is directly connected by, for example, near field communication (NFC), Bluetooth (registered trademark), and the like without passing through the communication network 41.

Note that, hereinafter, in a case where each unit of the vehicle control system 11 performs communication via the communication network 41, description of the communication network 41 will be omitted. For example, in a case where the processor 21 and the communication unit 22 perform communication via the communication network 41, it is simply described that the processor 21 and the communication unit 22 perform communication.

The processor 21 includes, for example, various processors such as a central processing unit (CPU), a micro processing unit (MPU), an electronic control unit (ECU), and the like. The processor 21 controls the entire vehicle control system 11.

The communication unit 22 communicates with various devices inside and outside the vehicle, other vehicles, servers, base stations, and the like, and transmits and receives various data. As the communication with the outside of the vehicle, for example, the communication unit 22 receives a program for updating software for controlling operation of the vehicle control system 11, map information, traffic information, information around the vehicle 1, and the like from the outside. For example, the communication unit 22 transmits information regarding the vehicle 1 (for example, data indicating a state of the vehicle 1, a recognition result by a recognition unit 73, and the like), information around the vehicle 1, and the like to the outside. For example, the communication unit 22 performs communication corresponding to a vehicle emergency call system such as an eCall and the like.

Note that a communication system of the communication unit 22 is not particularly limited. Furthermore, a plurality of communication systems may be used.

As the communication with the inside of the vehicle, for example, the communication unit 22 performs wireless communication with a device in the vehicle by a communication system such as wireless LAN, Bluetooth, NFC, wireless USB (WUSB), and the like. For example, the communication unit 22 performs wired communication with a device in the vehicle by a communication system such as a universal serial bus (USB), a high-definition multimedia interface (HDMI, registered trademark), a mobile high-definition link (MHL), and the like via a connection terminal (not shown) (and a cable if necessary).

Here, the device in the vehicle is, for example, a device that is not connected to the communication network 41 in the vehicle. For example, a mobile device or a wearable device carried by an occupant such as a driver and the like, an information device brought into the vehicle and temporarily installed, and the like are assumed.

For example, the communication unit 22 communicates with a server and the like existing on an external network (for example, the Internet, a cloud network, or a company-specific network) via a base station or an access point by a wireless communication system such as the fourth generation mobile communication system (4G), the fifth generation mobile communication system (5G), long term evolution (LTE), dedicated short range communications (DSRC), and the like.

For example, the communication unit 22 communicates with a terminal existing in the vicinity of a host vehicle (for example, a terminal of a pedestrian or a store, or a machine type communication (MTC) terminal) using a peer to peer (P2P) technology. For example, the communication unit 22 performs V2X communication. The V2X communication is, for example, vehicle to vehicle communication with another vehicle, vehicle to infrastructure communication with a roadside device and the like, vehicle to home communication, vehicle to pedestrian communication with a terminal and the like possessed by a pedestrian, and the like.

For example, the communication unit 22 receives an electromagnetic wave transmitted by a vehicle information and communication system ((VICS), registered trademark) such as a radio wave beacon, an optical beacon, FM multiplex broadcasting, and the like.

The map information accumulation unit 23 accumulates a map acquired from the outside and a map created by the vehicle 1. For example, the map information accumulation unit 23 accumulates a three-dimensional high-precision map, a global map having lower precision than the high-precision map and covering a wide area, and the like.

The high-precision map is, for example, a dynamic map, a point cloud map, a vector map (also referred to as an advanced driver assistance system (ADAS) map), and the like. The dynamic map is, for example, a map including four layers of dynamic information, semi-dynamic information, semi-static information, and static information, and is provided from an external server and the like. The point cloud map is a map including point clouds (point cloud data). The vector map is a map in which information such as positions of a lane, a signal, and the like is associated with the point cloud map. The point cloud map and the vector map may be provided from, for example, an external server and the like, or may be created by the vehicle 1 as a map for performing matching with a local map to be described later on the basis of sensing results by a radar 52, a LiDAR 53, and the like. The maps are accumulated in the map information accumulation unit 23. Furthermore, in a case where the high-precision map is provided from the external server and the like, for example, map data of several hundred square meters regarding a planned route on which the vehicle 1 travels from now is acquired from the server and the like in order to reduce a communication capacity.

The GNSS reception unit 24 receives a GNSS signal from a GNSS satellite, and supplies the GNSS signal to the travel assistance/automated driving control unit 29.

The external recognition sensor 25 includes various sensors used for recognizing a situation outside the vehicle 1, and supplies sensor data from each sensor to each unit of the vehicle control system 11. The type and number of sensors included in the external recognition sensor 25 are arbitrary.

For example, the external recognition sensor 25 includes a camera 51, the radar 52, the light detection and ranging or laser imaging detection and ranging (LiDAR) 53, and an ultrasonic sensor 54. The number of the cameras 51, the radars 52, the LiDAR 53, and the ultrasonic sensors 54 is arbitrary, and an example of a sensing area of each sensor will be described later.

Note that, as the camera 51, for example, a camera of an arbitrary imaging system such as a time of flight (ToF) camera, a stereo camera, a monocular camera, an infrared camera, and the like is used as necessary.

Furthermore, for example, the external recognition sensor 25 includes an environment sensor for detecting weather, meteorological phenomena, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each unit of the vehicle control system 11. The type and number of sensors included in the in-vehicle sensor 26 are arbitrary.

For example, the in-vehicle sensor 26 includes a camera, a radar, a seating sensor, a steering wheel sensor, a microphone, a biological sensor, and the like. As the camera, for example, a camera of any imaging system such as a ToF camera, a stereo camera, a monocular camera, an infrared camera, and the like can be used. The biological sensor is provided, for example, on a seat, a steering wheel, and the like, and detects various types of biological information of an occupant such as a driver and the like.

The vehicle sensor 27 includes various sensors for detecting a state of the vehicle 1, and supplies sensor data from each sensor to each unit of the vehicle control system 11. The type and number of sensors included in the vehicle sensor 27 are arbitrary.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects a rotation speed of an engine or a motor, an air pressure sensor that detects air pressure of a tire, a slip rate sensor that detects a slip rate of the tire, and a wheel speed sensor that detects a rotation speed of a wheel. For example, the vehicle sensor 27 includes a battery sensor that detects a remaining amount and temperature of a battery and an impact sensor that detects an external impact.

The recording unit 28 includes, for example, a read only memory (ROM), a random access memory (RAM), a magnetic storage device such as a hard disc drive (HDD) and the like, a semiconductor storage device, an optical storage device, a magneto-optical storage device, and the like. The recording unit 28 records various programs, data, and the like used by each unit of the vehicle control system 11. For example, the recording unit 28 records a rosbag file including a message transmitted and received by a robot operating system (ROS) in which an application program related to automated driving operates. For example, the recording unit 28 includes an event data recorder (EDR) and a data storage system for automated driving (DSSAD), and records information of the vehicle 1 before and after an event such as an accident and the like.

The travel assistance/automated driving control unit 29 controls travel assistance and automated driving of the vehicle 1. For example, the travel assistance/automated driving control unit 29 includes an analysis unit 61, an action planning unit 62, and an operation control unit 63.

The analysis unit 61 performs analysis processing of a situation of the vehicle 1 and the surroundings. The analysis unit 61 includes a self-position estimation unit 71, a sensor fusion unit 72, and the recognition unit 73.

The self-position estimation unit 71 estimates a self-position of the vehicle 1 on the basis of sensor data from the external recognition sensor 25 and a high-precision map accumulated in the map information accumulation unit 23. For example, the self-position estimation unit 71 generates a local map on the basis of the sensor data from the external recognition sensor 25, and estimates the self-position of the vehicle 1 by matching the local map with the high-precision map. The position of the vehicle 1 is based on, for example, the center of a rear wheel pair axle.

The local map is, for example, a three-dimensional high-precision map created using a technique such as simultaneous localization and mapping (SLAM) and the like, an occupancy grid map, and the like. The three-dimensional high-precision map is, for example, the above-described point cloud map and the like. The occupancy grid map is a map in which a three-dimensional or two-dimensional space around the vehicle 1 is divided into grids (lattices) of a predetermined size, and an occupancy state of an object is indicated in units of grids. The occupancy state of the object is indicated by, for example, the presence or absence or an existence probability of the object. The local map is also used for detection processing and recognition processing of a situation outside the vehicle 1 by the recognition unit 73, for example.

Note that the self-position estimation unit 71 may estimate the self-position of the vehicle 1 on the basis of a GNSS signal and sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 performs detection processing and recognition processing of a situation outside the vehicle 1.

For example, the recognition unit 73 performs detection processing and recognition processing of the situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The object detection processing is, for example, processing of detecting the presence or absence, size, a shape, a position, a movement, and the like of an object. The object recognition processing is, for example, processing of recognizing an attribute such as a type of an object and the like or identifying a specific object. However, the detection processing and the recognition processing are not necessarily clearly divided, and there is a case where the processing overlaps.

For example, the recognition unit 73 detects an object around the vehicle 1 by performing clustering for classifying point clouds based on sensor data from the LiDAR, the radar, and the like for each cluster of point clouds. Therefore, the presence or absence, size, a shape, and a position of the object around the vehicle 1 are detected.

For example, the recognition unit 73 detects a motion of the object around the vehicle 1 by performing tracking that follows a motion of the cluster of point clouds classified by clustering. Therefore, a speed and a traveling direction (movement vector) of the object around the vehicle 1 are detected.

For example, the recognition unit 73 recognizes a type of the object around the vehicle 1 by performing object recognition processing such as semantic segmentation and the like on image data supplied from the camera 51.

Note that, as the object to be detected or recognized, for example, a vehicle, a person, a bicycle, an obstacle, a structure, a road, a traffic light, a traffic sign, a road sign, and the like are assumed.

For example, the recognition unit 73 performs recognition processing of traffic rules around the vehicle 1 on the basis of a map accumulated in the map information accumulation unit 23, an estimation result of the self-position, and a recognition result of the object around the vehicle 1. By this processing, for example, a position and a state of the signal, contents of the traffic sign and the road sign, contents of a traffic regulation, a travelable lane, and the like are recognized.

For example, the recognition unit 73 performs recognition processing of an environment around the vehicle 1. As the surrounding environment to be recognized, for example, weather, temperature, humidity, brightness, a state of a road surface, and the like are assumed.

The action planning unit 62 creates an action plan of the vehicle 1. For example, the action planning unit 62 creates the action plan by performing processing of global path planning and path following.

Note that the global path planning is processing of planning a rough path from a start to a goal. This global path planning includes processing of local path generation called local path planning that enables safe and smooth traveling in the vicinity of the vehicle 1 in consideration of motion characteristics of the vehicle 1 in the path planned by the global path planning.

The path following is processing of planning operation for safely and accurately traveling the path planned by the global path planning within a planned time. For example, a target speed and a target angular velocity of the vehicle 1 are calculated.

The operation control unit 63 controls operation of the vehicle 1 in order to realize the action plan created by the action planning unit 62.

For example, the operation control unit 63 controls a steering control unit 81, a brake control unit 82, and a drive control unit 83 to perform acceleration/deceleration control and direction control such that the vehicle 1 travels on the local path calculated by the local path planning. For example, the operation control unit 63 performs cooperative control for the purpose of implementing functions of the ADAS such as collision avoidance or impact mitigation, following traveling, vehicle speed maintaining traveling, collision warning of a host vehicle, lane deviation warning of the host vehicle, and the like. For example, the operation control unit 63 performs cooperative control for the purpose of automated driving and the like in which a vehicle autonomously travels without depending on an operation of a driver.

The DMS 30 performs authentication processing of a driver, recognition processing of a state of the driver, and the like on the basis of sensor data from the in-vehicle sensor 26, input data input to the HMI 31, and the like. As the state of the driver to be recognized, for example, a physical condition, a wakefulness level, a concentration level, a fatigue level, a line-of-sight direction, a drunkenness level, a driving operation, a posture, and the like are assumed.

Note that the DMS 30 may perform authentication processing of an occupant other than the driver and recognition processing of a state of the occupant. Furthermore, for example, the DMS 30 may perform recognition processing of a situation inside the vehicle on the basis of sensor data from the in-vehicle sensor 26. As the situation inside the vehicle to be recognized, for example, temperature, humidity, brightness, odor, and the like are assumed.

The HMI 31 is used for inputting various data, instructions, and the like, generates an input signal on the basis of the input data, instructions, and the like, and supplies the input signal to each unit of the vehicle control system 11. For example, the HMI 31 includes an operation device such as a touch panel, a button, a microphone, a switch, a lever, and the like, an operation device that can be input by a method other than manual operation by voice, gesture, and the like, and the like. Note that the HMI 31 may be, for example, a remote control device using infrared rays or other radio waves, or an external connection device such as a mobile device, a wearable device, and the like compatible with an operation of the vehicle control system 11.

Furthermore, the HMI 31 generates and outputs visual information, auditory information, and tactile information to an occupant or the outside of the vehicle, and performs output control to control output contents, an output timing, an output method, and the like. The visual information is, for example, information indicated by an image or light such as an operation screen, a state display of the vehicle 1, a warning display, a monitor image indicating a situation around the vehicle 1, and the like. The auditory information is, for example, information indicated by a sound such as guidance, a warning sound, a warning message, and the like. The tactile information is, for example, information given to a tactile sense of an occupant by force, vibration, a motion, and the like.

As a device that outputs the visual information, for example, a display device, a projector, a navigation device, an instrument panel, a camera monitoring system (CMS), an electronic mirror, a lamp, and the like are assumed. The display device may be, for example, a device that displays visual information in a field of view of an occupant, such as a head-up display, a transmissive display, a wearable device having an augmented reality (AR) function, and the like, in addition to a device having a normal display.

As a device that outputs the auditory information, for example, an audio speaker, a headphone, an earphone, and the like are assumed.

As a device that outputs the tactile information, for example, a haptic element using haptic technology and the like are assumed. The haptic element is provided, for example, on a steering wheel, a seat, and the like.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including a steering wheel and the like, an electric power steering, and the like. The steering control unit 81 includes, for example, a control unit such as an ECU and the like that controls the steering system, an actuator that drives the steering system, and the like.

The brake control unit 82 performs detection, control, and the like of a state of a brake system of the vehicle 1. The brake system includes, for example, a brake mechanism including a brake pedal and the like, an antilock brake system (ABS), and the like. The brake control unit 82 includes, for example, a control unit such as an ECU and the like that controls the brake system, an actuator that drives the brake system, and the like.

The drive control unit 83 performs detection, control, and the like of a state of a drive system of the vehicle 1. The drive system includes, for example, a driving force generation device for generating a driving force such as an accelerator pedal, an internal combustion engine, a driving motor, and the like, a driving force transmission mechanism for transmitting the driving force to wheels, and the like. The drive control unit 83 includes, for example, a control unit such as an ECU and the like that controls the drive system, an actuator that drives the drive system, and the like.

The body system control unit 84 performs detection, control, and the like of a state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a control unit such as an ECU and the like that controls the body system, an actuator that drives the body system, and the like.

The light control unit 85 performs detection, control, and the like of states of various lights of the vehicle 1. As the light to be controlled, for example, a headlight, a backlight, a fog light, a turn signal, a brake light, a projection, a display of a bumper, and the like are assumed. The light control unit 85 includes a control unit such as an ECU and the like that controls the light, an actuator that drives the light, and the like.

The horn control unit 86 performs detection, control, and the like of a state of a car horn of the vehicle 1. The horn control unit 86 includes, for example, a control unit such as an ECU and the like that controls the car horn, an actuator that drives the car horn, and the like.

Figure 2:
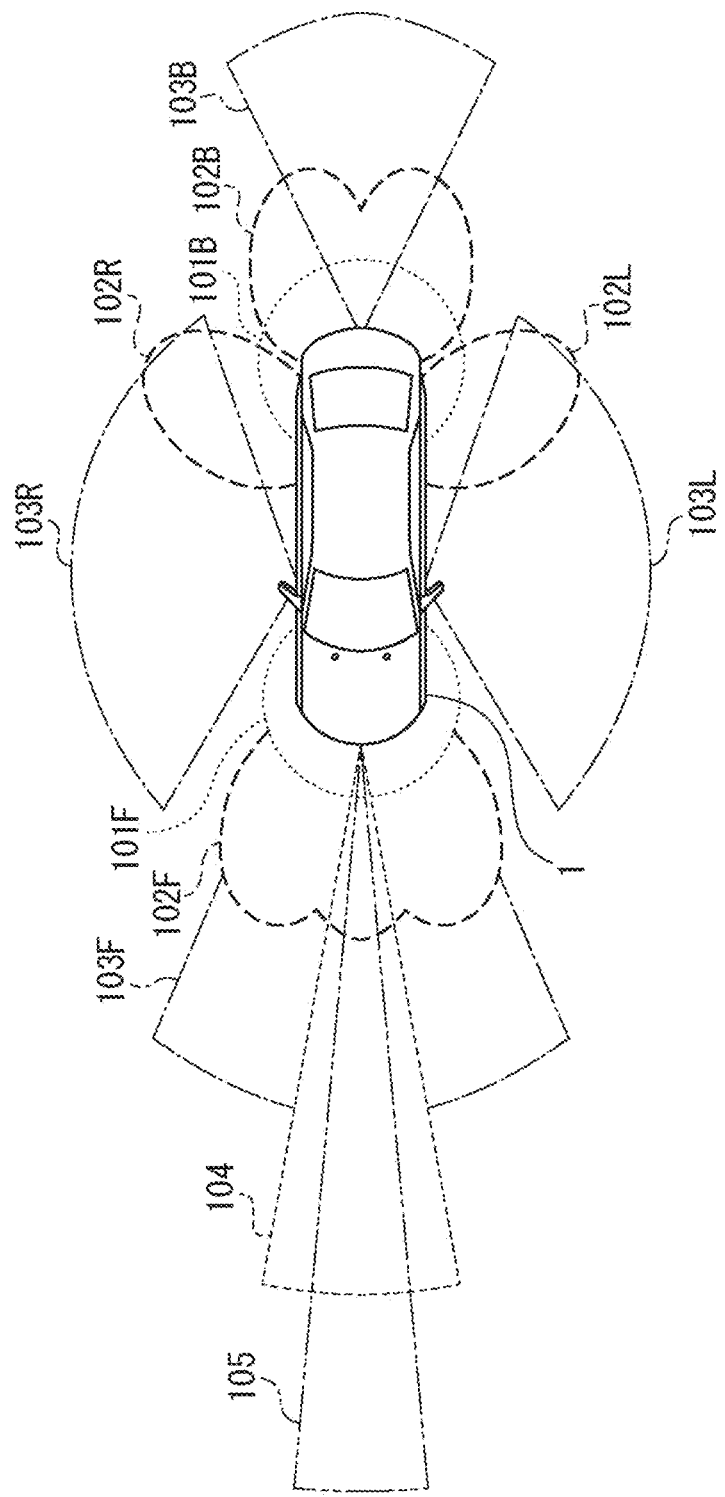
FIG. 2 is a diagram illustrating examples of sensing areas.

FIG. 2 is a diagram illustrating examples of sensing areas by the camera 51, the radar 52, the LiDAR 53, and the ultrasonic sensor 54 of the external recognition sensor 25 in FIG. 1.

A sensing area 101F and a sensing area 101B illustrate examples of sensing areas by the ultrasonic sensor 54. The sensing area 101F covers the periphery of a front end of the vehicle 1. The sensing area 101B covers the periphery of a rear end of the vehicle 1.

Sensing results in the sensing area 101F and the sensing area 101B are used, for example, for parking assistance and the like of the vehicle 1.

Sensing areas 102F to 102B illustrate examples of sensing areas by the radar 52 for a short distance or a middle distance. The sensing area 102F covers a position farther than the sensing area 101F in front of the vehicle 1. The sensing area 102B covers a position farther than the sensing area 101B behind the vehicle 1. A sensing area 102L covers the rear periphery of a left side surface of the vehicle 1. A sensing area 102R covers the rear periphery of a right side surface of the vehicle 1.

A sensing result in the sensing area 102F is used, for example, for detection and the like of a vehicle, a pedestrian, and the like existing in front of the vehicle 1. A sensing result in the sensing area 102B is used, for example, for a collision prevention function and the like behind the vehicle 1. Sensing results in the sensing area 102L and the sensing area 102R are used, for example, for detection and the like of an object in a blind spot on the side of the vehicle 1.

Sensing areas 103F to 103B illustrate examples of sensing areas by the camera 51. The sensing area 103F covers a position farther than the sensing area 102F in front of the vehicle 1. The sensing area 103B covers a position farther than the sensing area 102B behind the vehicle 1. A sensing area 103L covers the periphery of the left side surface of the vehicle 1. A sensing area 103R covers the periphery of the right side surface of the vehicle 1.

A sensing result in the sensing area 103F is used for, for example, recognition of a traffic light or a traffic sign, a lane departure prevention assist system, and the like. A sensing result in the sensing area 103B is used for, for example, parking assistance, a surround view system, and the like. Sensing results in the sensing area 103L and the sensing area 103R are used for, for example, a surround view system and the like.

A sensing area 104 shows an example of a sensing area by the LiDAR 53. The sensing area 104 covers a position farther than the sensing area 103F in front of the vehicle 1. On the other hand, the sensing area 104 has a narrower range in a left-right direction than the sensing area 103F.

A sensing result in the sensing area 104 is used for, for example, emergency braking, collision avoidance, pedestrian detection, and the like.

A sensing area 105 illustrates an example of a sensing area by the radar 52 for a long distance. The sensing area 105 covers a position farther than the sensing area 104 in front of the vehicle 1. On the other hand, the sensing area 105 has a narrower range in the left-right direction than the sensing area 104.

A sensing result in the sensing area 105 is used for, for example, adaptive cruise control (ACC) and the like.

Note that the sensing area of each sensor may have various configurations other than those in FIG. 2. Specifically, the ultrasonic sensor 54 may also sense the side of the vehicle 1, or the LiDAR 53 may sense the rear of the vehicle 1.

2. Embodiment

Next, an embodiment of the present technology will be described with reference to FIGS. 3 to 12.

<Configuration Example of Information Processing System 201>

Figure 3:
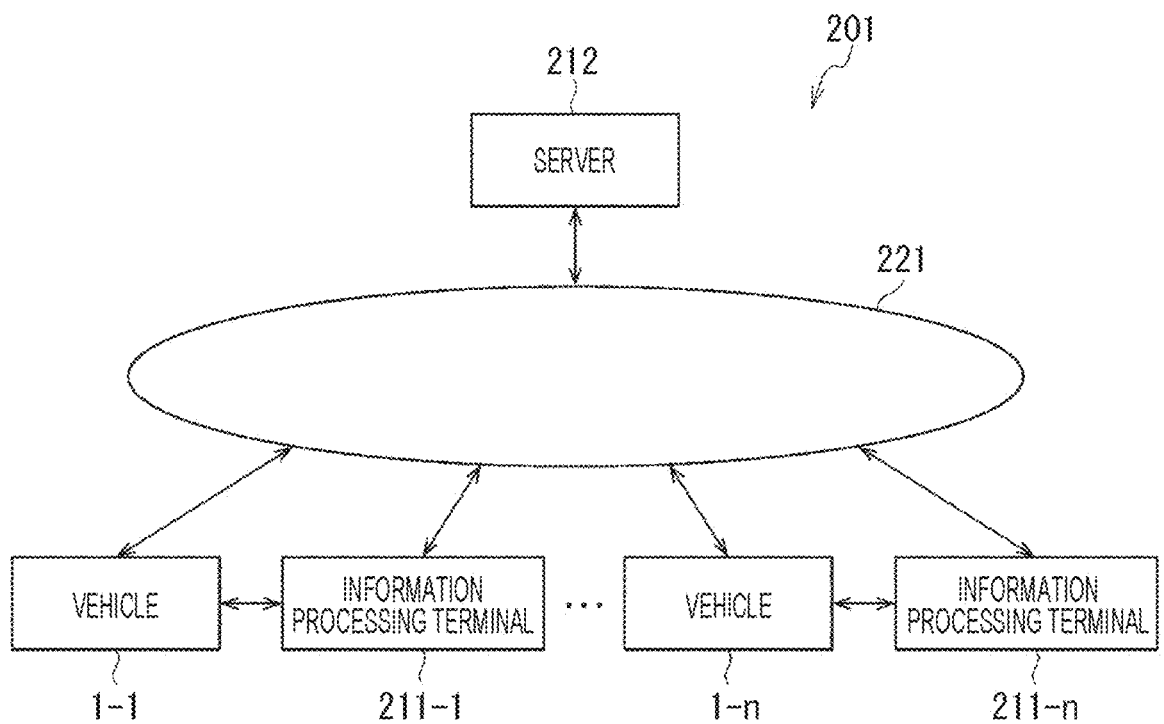
FIG. 3 is a block diagram showing an embodiment of an information processing system to which the present technology is applied.

FIG. 3 illustrates an embodiment of an information processing system 201 to which the present technology is applied.

The information processing system 201 is a system that simulates a characteristic of an internal combustion engine vehicle in the vehicle 1 that is a non-internal combustion engine vehicle so that a user (driver) of the vehicle 1 can experience a sense of traveling of the internal combustion engine vehicle.

The information processing system 201 includes the above-described vehicles 1-1 to 1-n, information processing terminals 211-1 to 211-n, and a server 212.

Note that, hereinafter, in a case where it is not necessary to individually distinguish the vehicles 1-1 to 1-n, they are simply referred to as the vehicle 1. Hereinafter, in a case where it is not necessary to individually distinguish the information processing terminals 211-1 to 211-n, they are simply referred to as an information processing terminal 211.

Communication via a network 221 is possible between each vehicle 1 and the server 212, between each information processing terminal 211 and the server 212, between each vehicle 1 and each information processing terminal 211, between the vehicles 1, and between the information processing terminals 211. Furthermore, it is also possible to directly communicate between each vehicle 1 and each information processing terminal 211, between the vehicles 1, and between the information processing terminals 211 without using the network 221.

The vehicle 1 is an electric vehicle that is a non-internal combustion engine vehicle which does not have a multistage transmission mechanism. The vehicle 1 receives a data set (hereinafter referred to as a vehicle simulation data set) for simulating a characteristic of an internal combustion engine vehicle to be simulated (hereinafter referred to as a simulation target vehicle) from the server 212 via the network 221. Furthermore, the vehicle 1 receives the vehicle simulation data set from the information processing terminal 211 or the other vehicle 1 via the network 221 or not via the network 221. The vehicle 1 simulates the characteristic of the simulation target vehicle on the basis of the received vehicle simulation data set.

The information processing terminal 211 includes, for example, a smartphone, a tablet terminal, a personal computer (PC), and the like, and is used by a user of the vehicle 1. The information processing terminal 211 receives the vehicle simulation data set from the server 212 via the network 221. Furthermore, the information processing terminal 211 can receive the vehicle simulation data set from the other information processing terminal 211 or each vehicle 1 via the network 221 or not via the network 221. The information processing terminal 211 transmits the received vehicle simulation data set to the vehicle 1 via the network 221 or not via the network 221. At this time, the information processing terminal 211 processes the vehicle simulation data set as necessary, and transmits the processed simulation data to the vehicle 1.

Furthermore, the information processing terminal 211 generates the vehicle simulation data set. The information processing terminal 211 transmits the generated vehicle simulation data set to the vehicle 1 via the network 221 or not via the network 221. Furthermore, the information processing terminal 211 can upload the generated or processed vehicle simulation data set to the server 212 via the network 221 and disclose the vehicle simulation data set.

The server 212 discloses simulation parameter sets of various simulation target vehicles so that each vehicle 1 and each information processing terminal 211 can download the simulation parameter sets.

<Configuration Example of ECUs of Vehicle 1>

Figure 4:
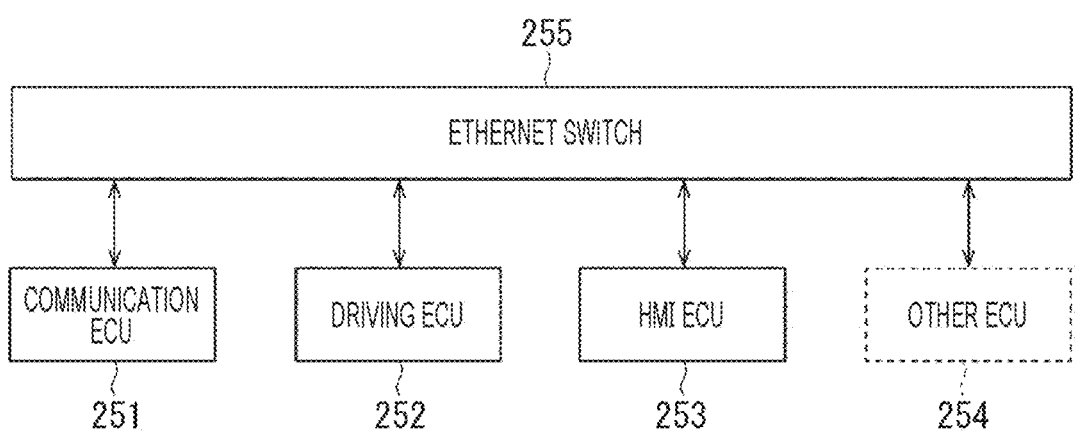
FIG. 4 is a block diagram illustrating a configuration example of ECUs.

Next, a configuration example of ECUs of the vehicle 1 will be described with reference to FIG. 4.

The vehicle 1 includes a communication ECU 251, a driving ECU 252, an HMI ECU 253, and another ECU 254. The communication ECU 251, the driving ECU 252, the HMI ECU 253, and the other ECU 254 are connected to an Ethernet switch 255 and can communicate with each other.

The communication ECU 251 is, for example, an ECU that implements a function of the communication unit 22 of the vehicle 1.

The driving ECU 252 is, for example, an ECU that performs drive control of the vehicle 1. For example, the driving ECU 252 implements some or all functions of the vehicle control unit 32 including the drive control unit 83 of the vehicle 1.

The HMI ECU 253 is, for example, an ECU that controls the HMI 31 of the vehicle 1.

The other ECU 254 is an ECU for implementing a function other than the communication ECU 251, the driving ECU 252, and the HMI ECU 253, and is provided as necessary.

Note that the configuration example of the ECUs of the vehicle 1 is not limited to this example, and can be arbitrarily changed. However, in order to simulate the characteristic of the simulation target vehicle in the vehicle 1, it is necessary to install a program and data for realizing the characteristic in the related ECU.

Therefore, in order to prevent the configuration of the program and the data and the processing of each ECU from becoming complicated, it is desirable to aggregate and reduce the number of related ECUs. For example, it is desirable to adopt a centralized system that integrates functions into the driving ECU 252, the HMI ECU 253, and the like (for example, an E/E architecture including a large-scale ECU, and the like).

<Configuration Example of Vehicle Simulation System 301>

Figure 5:
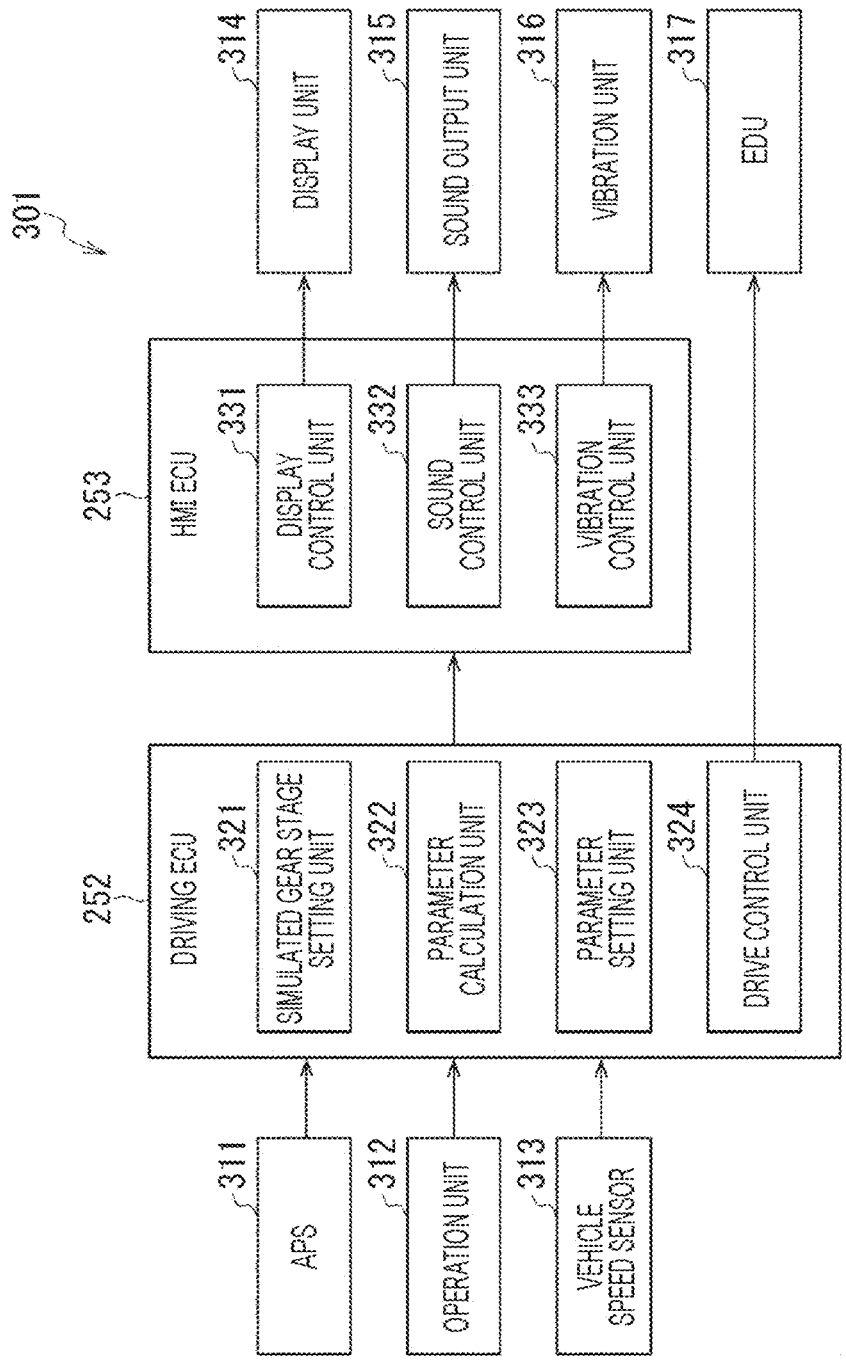
FIG. 5 is a block diagram illustrating an embodiment of a vehicle simulation system to which the present technology is applied.

FIG. 5 illustrates a configuration example of a vehicle simulation system 301 included in the vehicle 1. Note that, in FIG. 5, the Ethernet switch 255 between the driving ECU 252 and the HMI ECU 253 is not illustrated.

The vehicle simulation system 301 is a system for simulating a characteristic of a simulation target vehicle. The vehicle simulation system 301 includes an accel position sensor (APS) 311, an operation unit 312, a vehicle speed sensor 313, the driving ECU 252, the HMI ECU 253, a display unit 314, a sound output unit 315, a vibration unit 316, and an electric drive unit (EDU) 317.

The APS 311 is included in, for example, the vehicle sensor 27 of FIG. 1. The APS 311 detects, for example, an accelerator pedal opening indicating a stepping amount of the accelerator pedal of the vehicle 1 and a stepping speed of the accelerator pedal. The APS 311 supplies data indicating a detection result (hereinafter referred to as AP data) to the driving ECU 252.

The operation unit 312 is included in the HMI 31 of FIG. 1, for example. The operation unit 312 includes, for example, an operation device (for example, a paddle shift) for simulating a gear change (change of a shift position) of the vehicle 1. The operation unit 312 supplies an operation signal indicating operation contents to the driving ECU 252.

Note that the vehicle 1 does not have a multistage transmission mechanism as described above and includes only one type of gear, and thus cannot physically change gears. On the other hand, as described later, in order for the vehicle 1 to simulate a traveling feeling of the simulation target vehicle, a gear change is simulatively performed using the operation unit 312.

The vehicle speed sensor 313 is provided, for example, in the vehicle sensor 27 of FIG. 1. The vehicle speed sensor 313 detects a speed of the vehicle 1 and supplies data indicating a detection result (hereinafter referred to as vehicle speed data) to the driving ECU 252.

The driving ECU 252 implements functions including a simulated gear stage setting unit 321, a parameter calculation unit 322, a parameter setting unit 323, and a drive control unit 324.

The simulated gear stage setting unit 321 simulatively sets a gear stage (hereinafter, a simulated gear stage) of the vehicle 1 on the basis of the AP data, the operation signal of the operation unit 312, the vehicle speed data, and the like. The simulated gear stage setting unit 321 can cope with both of a simulative gear change (manual shift) by an operation of the operation unit 312 and an automated and simulative gear change (automatic shift) according to the accelerator pedal opening and the vehicle speed.

The parameter calculation unit 322 calculates a parameter for control of the simulation target vehicle (hereinafter referred to as a simulation target vehicle parameter) corresponding to each state of the vehicle 1 on the basis of the vehicle simulation data set, the AP data, the operation signal of the operation unit 312, the vehicle speed data, and the like.

The parameter setting unit 323 sets a parameter for control of the vehicle 1 (hereinafter referred to as a host vehicle parameter) on the basis of the vehicle simulation data set, the AP data, the operation signal of the operation unit 312, the vehicle speed data, the simulation target vehicle parameter, and the like.

The drive control unit 324 controls the EDU 317 on the basis of the host vehicle parameter.

Note that the driving ECU 252 supplies the AP data, the operation signal, the vehicle speed data, data indicating the simulated gear stage, the simulation target vehicle parameter, and the host vehicle parameter to the HMI ECU 253 as necessary. Note that the AP data, the operation signal, and the vehicle speed data may be directly supplied from the APS 311, the operation unit 312, and the vehicle speed sensor 313 to the HMI ECU 253 without passing through the driving ECU 252.

The HMI ECU 253 implements functions including a display control unit 331, a sound control unit 332, and a vibration control unit 333.

The display control unit 331 controls the display unit 314 to perform display simulating the simulation target vehicle on the basis of the vehicle simulation data set, the simulation target vehicle parameter, and the like. For example, the display control unit 331 causes the display unit 314 to display an image simulating an instrument panel of the simulation target vehicle.

The sound control unit 332 controls the sound output unit 315 to output an output sound simulating a sound of the simulation target vehicle on the basis of the vehicle simulation data set, the simulation target vehicle parameter, and the like. For example, the sound control unit 332 causes the sound output unit 315 to output an output sound simulating an engine sound of the simulation target vehicle.

The vibration control unit 333 controls the vibration unit 316 so as to output vibration simulating the simulation target vehicle on the basis of the vehicle simulation data set, the simulation target vehicle parameter, and the like. For example, the vibration control unit 333 causes the vibration unit 316 to output vibration simulating vibration at the time of gear change of the simulation target vehicle.

The display unit 314 is included in the HMI 31 of FIG. 1, for example. The display unit 314 includes, for example, a display disposed in front of a dashboard of the vehicle 1, and displays an image and the like simulating the instrument panel of the simulation target vehicle.

The sound output unit 315 is included in the HMI 131 in FIG. 1, for example. The sound output unit 315 includes, for example, a voice synthesis device, a speaker, and the like, and outputs an output sound that simulates a sound of the simulation target vehicle.

The vibration unit 316 is included in the HMI 131 of FIG. 1, for example. The vibration unit 316 includes, for example, a haptic element provided in a portion directly or indirectly touched by a body of a user (driver) such as a steering wheel, an accelerator pedal, a driver's seat, and the like of the vehicle 1, and outputs vibration simulating vibration of the simulation target vehicle.

The EDU 317 includes, for example, an electric motor and the like that is a power source of the vehicle 1.

<Vehicle Simulation Data Set>

Next, a configuration example of the vehicle simulation data set will be described.

The vehicle simulation data set includes, for example, the following data.

a) Driving force characteristic
b) Engine speed during neutral
c) Engine speed during idling
d) Reaction speed of engine to accelerator pedal operation
e) Maximum engine speed and maximum speed (speed limit)
f) Gear ratio in each gear stage
g) Design of instrument panel h) Sound data of internal combustion engine
i) Start time characteristic
j) Other specifications of simulation target vehicle
k) Vehicle simulation program Hereinafter, individual data will be described.

a) Driving Force Characteristic

For example, a driving force characteristic in a predetermined gear stage (hereinafter, referred to as a reference gear stage) of the simulation target vehicle is actually measured. Here, the driving force characteristic is, for example, a characteristic obtained by adding a shift of a transmission to an output characteristic that is power of the engine of the simulation target vehicle.

Specifically, for example, a characteristic indicating a relationship among an accelerator pedal opening, an engine speed, and an engine torque (hereinafter, referred to as an accelerator pedal opening-engine speed-engine torque characteristic) in the reference gear stage of the simulation target vehicle is used for the driving force characteristic.

For example, the engine torque with respect to the engine speed is actually measured in a state where the gear stage of the simulation target vehicle is set to the reference gear stage and the accelerator pedal opening is fixed to a predetermined value. Then, the engine torque with respect to the engine speed is actually measured while the accelerator pedal opening is changed at predetermined intervals with the gear stage fixed to the reference gear stage. Then, data in which the accelerator pedal opening-engine speed-engine torque characteristic is calibrated is generated on the basis of a measured value.

Furthermore, for example, a characteristic indicating a relationship among the accelerator pedal opening, the engine speed, and a longitudinal acceleration (hereinafter, referred to as an accelerator pedal opening-engine speed-longitudinal acceleration characteristic) in the reference gear stage of the simulation target vehicle is used for the driving force characteristic.

For example, the longitudinal acceleration of the simulation target vehicle with respect to the engine speed is actually measured in a state where the gear stage of the simulation target vehicle is set to the reference gear stage and the accelerator pedal opening is fixed to the predetermined value. Then, the longitudinal acceleration with respect to the engine speed is actually measured while the accelerator pedal opening is changed at predetermined intervals with the gear stage fixed to the reference gear stage. Then, data in which the accelerator pedal opening-engine speed-longitudinal acceleration characteristic is calibrated is generated on the basis of a measured value.

Figure 6:
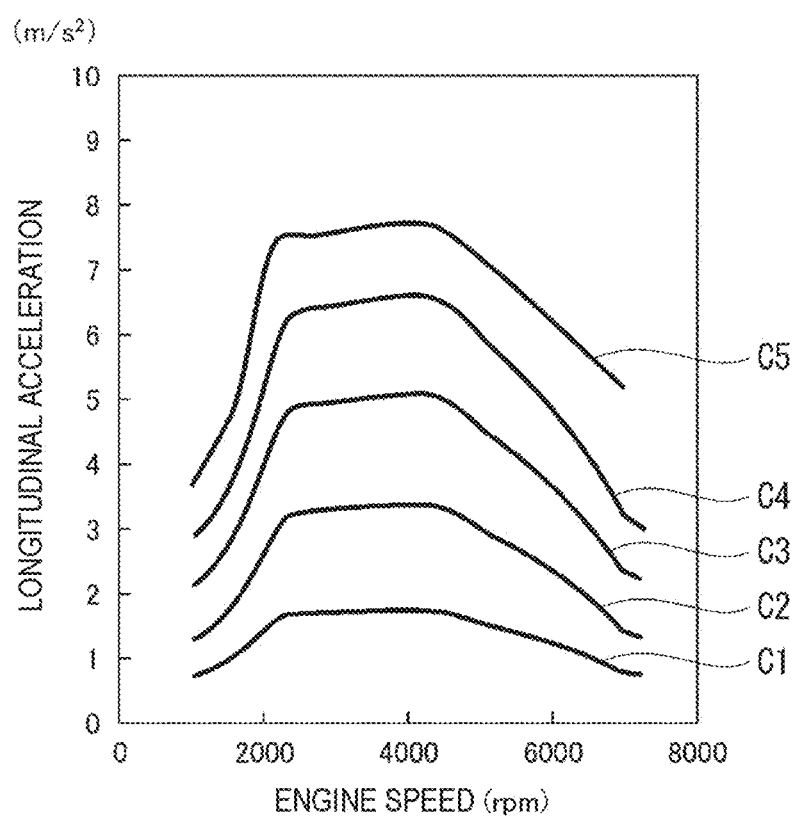
FIG. 6 is a graph illustrating an example of an accelerator pedal opening-engine speed-longitudinal acceleration characteristic.

FIG. 6 is a graph illustrating an example of the accelerator pedal opening-engine speed-longitudinal acceleration characteristic. In FIG. 6, the horizontal axis represents an engine speed (unit: rpm), and the vertical axis represents a longitudinal acceleration (unit: m/s$^2$) of the simulation target vehicle. A curve C1 indicates an engine speed-longitudinal acceleration characteristic when the accelerator pedal opening is set to 20%. A curve C2 indicates the engine speed-longitudinal acceleration characteristic when the accelerator pedal opening is set to 40%. A curve C3 indicates the engine speed-longitudinal acceleration characteristic when the accelerator pedal opening is set to 60%. A curve C4 indicates the engine speed-longitudinal acceleration characteristic when the accelerator pedal opening is set to 80%. A curve C5 indicates the engine speed-longitudinal acceleration characteristic when the accelerator pedal opening is set to 100%.

Note that a torque of a wheel shaft is calculated by dividing the engine torque by a gear ratio in the reference gear stage. A longitudinal force of a ground contact surface is calculated by dividing the torque of the wheel shaft by a tire radius. Then, the longitudinal acceleration is calculated by dividing the longitudinal force by a vehicle body weight of the simulation target vehicle. Therefore, since the gear ratio in the reference gear stage, the tire radius, and the vehicle body weight are fixed values, the curve of the graph of the accelerator pedal opening-engine speed-longitudinal acceleration characteristic and the curve of the graph of the accelerator pedal opening-engine speed-longitudinal acceleration characteristic have substantially the same shape.

Furthermore, which one of the engine torque and the longitudinal acceleration is used is arbitrary, and for example, one that easily obtains (measures) data is used.

Then, data indicating the accelerator pedal opening-engine speed-engine torque characteristic or the accelerator pedal opening-engine speed-longitudinal acceleration characteristic in the reference gear stage is stored in the vehicle simulation data set.

Note that it is also conceivable that driving force characteristics in gear stages other than the reference gear stage are similarly actually measured and stored in the vehicle simulation data set. However, it is not very realistic to actually measure the driving force characteristics and generate data for all the gear stages because a very large load and cost are generated.

On the other hand, as described later, a driving force characteristic in a gear stage other than the reference gear stage is calculated on the basis of the gear ratio in the reference gear stage and a gear ratio in a target gear stage.

b) Engine Speed During Neutral

In a state where the gear stage of the simulation target vehicle is set to neutral, a characteristic of the engine speed with respect to the accelerator pedal opening is actually measured. Then, data obtained by calibrating an accelerator pedal opening-engine speed characteristic during neutral on the basis of a measured value is stored in the vehicle simulation data set.

c) Engine Speed During Idling

The engine speed of the simulation target vehicle during idling is actually measured. Then, data indicating a measured value is stored in the vehicle simulation data set.

d) Reaction Speed of Engine to Accelerator Pedal Operation

For example, in the simulation target vehicle, a reaction speed (≈throttle response) of the engine with respect to an accelerator pedal operation is actually measured. For example, in the simulation target vehicle, a time from when the accelerator pedal is stepped on until the engine speed starts to increase (hereinafter, referred to as an engine speed increase reaction time) is actually measured. Furthermore, in the simulation target vehicle, a time from when the accelerator pedal is released until the engine speed starts to decrease (hereinafter, referred to as an engine speed decrease reaction time) is actually measured. Then, data indicating the engine speed increase reaction time and the engine speed decrease reaction time is stored in the vehicle simulation data set.

e) Maximum Engine Speed and Maximum Speed (Speed Limit)

For example, a maximum speed in each gear stage is calculated on the basis of a maximum engine speed of the simulation target vehicle, a gear ratio in each gear stage, and a circumferential length of the tire. Then, data indicating the maximum engine speed and the maximum speed in each gear stage is stored in the vehicle simulation data set.

Note that, for example, the maximum speed in each gear stage may be actually measured in the simulation target vehicle. Alternatively, for example, a maximum speed in the reference gear stage may be actually measured in the simulation target vehicle, and the maximum speed in each gear stage may be calculated on the basis of the gear ratio in the reference gear stage and the gear ratio in the target gear stage.

f) Gear Ratio in Each Gear Stage

The number of gear stages (number of shifts) of the simulation target vehicle and the gear ratio in each gear stage are stored in the vehicle simulation data set.

g) Design of Instrument Panel

Image data indicating an image simulating design of the instrument panel of the simulation target vehicle is generated. Then, the generated image data is stored in the vehicle simulation data set.

h) Sound Data of Internal Combustion Engine

Sound data representing an output sound that simulates a sound of the internal combustion engine (for example, the engine sound) of the simulation target vehicle is generated. Then, the generated sound data is stored in the vehicle simulation data set.

i) Start Time Characteristic

For example, in order to simulate acceleration by clutch meet and a torque converter at the start of the simulation target vehicle, data indicating a time from an operation of the accelerator pedal at the start of the simulation target vehicle to the start of traveling (hereinafter referred to as a start reaction time) is stored in the vehicle simulation data set. Note that the start reaction time does not necessarily need to be actually measured in the simulation target vehicle, and may be common to all vehicles.

j) Other Specifications of Simulation Target Vehicle

For example, data indicating specifications of the simulation target vehicle necessary for calculation of the longitudinal acceleration (for example, the vehicle body weight, the tire radius, and the like) is stored in the vehicle simulation data set.

k) Vehicle Simulation Program

A vehicle simulation program for simulating the characteristic of the simulation target vehicle in the vehicle 1 is stored in the vehicle simulation data set. Note that, for example, the vehicle simulation program may be provided separately from the vehicle simulation data set.

<Type of Simulation Target Vehicle>

Next, an example of a type of the simulation target vehicle will be described.

For example, the simulation target vehicle includes an existing vehicle. The existing vehicle includes not only a vehicle currently sold but also a vehicle sold in the past (for example, a famous car and the like).

For example, the simulation target vehicle includes an imaginary vehicle. The imaginary vehicle is a vehicle that does not exist in reality, and includes, for example, a vehicle appearing in a movie, a game, and the like.

Furthermore, the imaginary vehicle includes an original vehicle. For example, a user creates an original vehicle simulation data set in the information processing terminal 211, whereby the original vehicle is realized. More specifically, for example, the user creates a new vehicle simulation data set in a game and the like in which the user races a vehicle, whereby the original vehicle is realized.

For example, the simulation target vehicle includes a remodeled vehicle of an existing vehicle or an imaginary vehicle. Specifically, the user processes a vehicle simulation data set of an existing vehicle or an imaginary vehicle in the information processing terminal 211, thereby realizing a remodeled vehicle. More specifically, for example, the user can change a characteristic of the existing vehicle or the imaginary vehicle by tuning or setting the vehicle simulation data set of the existing vehicle or the imaginary vehicle in the game and the like described above.

Note that the driving force characteristic and the like described above cannot be actually measured in an old vehicle, an imaginary vehicle, and an original vehicle in which an actual vehicle capable of traveling does not exist. In this case, for example, instead of actual measurement data, data created by designing and simulating and the like is used for the vehicle simulation data set.

<Method of Processing or Creating Vehicle Simulation Data Set>

As described above, the user can process or create the vehicle simulation data set. Here, an example of a method of processing or creating a driving force characteristic included in the vehicle simulation data set will be described with reference to FIG. 7.

Figure 7:
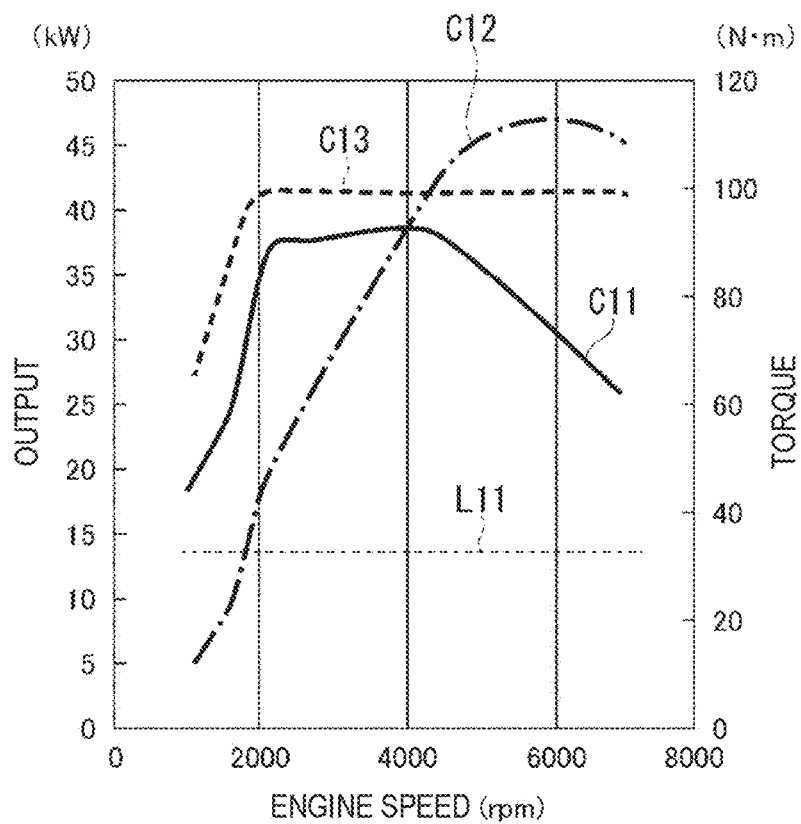
FIG. 7 is a diagram illustrating an example of a method of setting a driving force characteristic.

FIG. 7 illustrates an example of a setting screen of an accelerator pedal opening-engine speed-engine torque characteristic which is one of the driving force characteristics.

The setting screen of FIG. 7 displays a graph for setting the accelerator pedal opening-engine speed-engine torque characteristic. The horizontal axis of the graph represents an engine speed (unit: rpm), and the vertical axis represents an engine torque (unit: N·m) and an engine output (kW).

A curve C11 is, for example, a curve indicating an engine speed-engine torque characteristic in a case where the accelerator pedal opening is 100%. A curve C12 is a curve indicating an engine speed-engine output characteristic corresponding to the engine speed-engine torque characteristic of the curve C11. A curve C13 is a curve indicating an engine speed-maximum torque characteristic of the EDU 317 of the vehicle 1.

For example, the user can arbitrarily change the engine speed-engine torque characteristic of the simulation target vehicle by changing a shape of the curve C11. Note that a shape of the curve C12 is automatically changed in accordance with the change in the shape of the curve C11.

Here, in the internal combustion engine vehicle, since the specifications are different from those of UN R85 "horsepower measurement method", UN R101 "$CO_2$ emission and fuel consumption (passenger car)", and UN R51 "noise" that have been approved by the law, the driving force characteristic cannot be arbitrarily changed by the user.

On the other hand, the electric vehicle does not need to conform to UN R85 "horsepower measurement method" and UN R101 "CO2 emission and fuel consumption (passenger car)", but needs to conform to UN R51 "noise". In consideration of this point, the following restrictions are provided in a case where the user changes the driving force characteristic.

1. The torque and the output exceeding the maximum torque and a maximum output of the EDU 317 of the vehicle 1 cannot be set. For example, the curve C11 in FIG. 7 must be changed within a range below the curve C13.

2. A state in which the output is significantly low cannot be set. This is to prevent the acceleration and speed of the vehicle 1 from becoming too slow and causing trouble to surrounding vehicles. For example, the curve C11 must be changed within a range above a straight line L11.

3. It is not possible to set a condition that a vehicle exterior sound becomes larger than that at the time when the legal approval of a vehicle exterior sound regulation is passed. Note that the same applies to a sound of an internal combustion engine to be simulated.

Note that, although not illustrated in FIG. 7, the engine speed-engine torque characteristic is similarly set for other accelerator pedal openings.

Furthermore, it is also possible to process or create an engine speed-longitudinal acceleration characteristic at each accelerator pedal opening instead of the engine speed-engine torque characteristic at each accelerator pedal opening.

<Method of Operating Vehicle Simulation Data Set>

Figure 8:
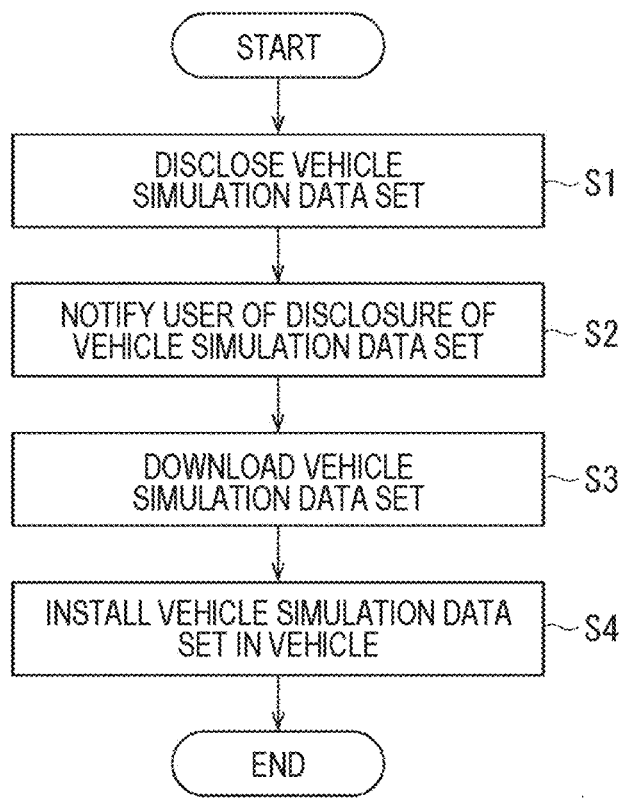
FIG. 8 is a flowchart for explaining a flow of a vehicle simulation data set.

Next, a method of operating a vehicle simulation data set in the information processing system 201 will be described with reference to a flowchart of FIG. 8.

In step S1, the server 212 discloses the vehicle simulation data set. For example, a provider of the vehicle simulation data set generates the vehicle simulation data set, uploads the vehicle simulation data set to the server 212, and discloses the vehicle simulation data set.

The provider of the vehicle simulation data set is, for example, a corporation or an individual who operates a service for providing a vehicle simulation data set, creates a vehicle simulation data set of an existing vehicle or an imaginary vehicle, and discloses the vehicle simulation data set on the server 212.

Alternatively, the provider of the vehicle simulation data set is a user. For example, the user downloads the vehicle simulation data set from the server 212 via the network 221 using the information processing terminal 211, and processes the downloaded vehicle simulation data set. Furthermore, for example, the user creates a new vehicle simulation data set using the information processing terminal 211. Then, the user uploads the processed or created vehicle simulation data set to the server 212 via the network 221 using the information processing terminal 211.

In step S2, the server 212 notifies the user of the disclosure of the vehicle simulation data set. For example, the server 212 transmits information regarding the newly disclosed vehicle simulation data set to each information processing terminal 211 via the network 221.

Figure 9:
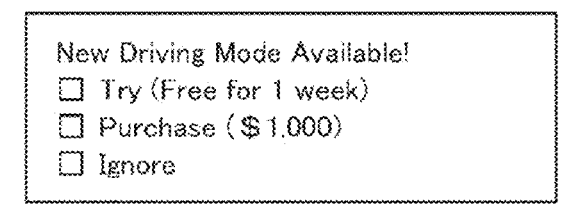
FIG. 9 is a diagram illustrating an example of a newly arrived information notification screen.

On the other hand, each information processing terminal 211 displays a newly arrived information notification screen of FIG. 9. This newly arrived information notification screen shows that (a driving mode based on) a new vehicle simulation data set is available.

Furthermore, three options are displayed. The first is an option to try the new vehicle simulation data set for one week. The second is an option to purchase the new simulation data for $1000. The third is an option to ignore the new vehicle simulation data set without trial or purchase.

In step S3, the information processing terminal 211 downloads the vehicle simulation data set. For example, in a case where the first option or the second option is selected on the newly arrived information notification screen of FIG. 9, the information processing terminal 211 downloads the new vehicle simulation data set via the network 221.

In step S4, the information processing terminal 211 installs the vehicle simulation data set in the vehicle 1. For example, the information processing terminal 211 transmits the downloaded vehicle simulation data set to the vehicle 1.

The communication ECU 251 of the vehicle 1 receives the vehicle simulation data set from the information processing terminal 211. The communication ECU 251 supplies the received vehicle simulation data set to the HMI ECU 253 via the Ethernet switch 255.

Figure 10:
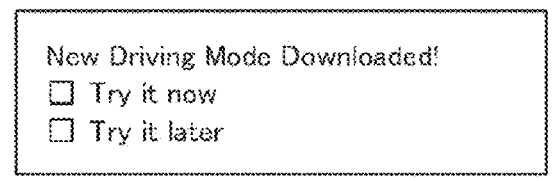
FIG. 10 is a diagram illustrating an example of a download notification screen.

The display unit 314 displays a download completion notification screen of FIG. 10 under the control of the display control unit 331. This download completion notification screen shows that (the driving mode based on) the new vehicle simulation data set has been downloaded.

Furthermore, two options are displayed. The first is an option to install and execute immediately. The second is an option to install and execute later.

For example, in a case where the first option is selected, the HMI ECU 253 supplies the vehicle simulation data set to a necessary ECU such as the driving ECU 252 and the like via the Ethernet switch 255. Each ECU including the HMI ECU 253 installs a vehicle simulation program included in the vehicle simulation data set.

In this way, the vehicle 1 can acquire the vehicle simulation data set from the server 212, install the vehicle simulation program included in the vehicle simulation data set, and simulate a characteristic of the simulation target vehicle.

Note that, for example, the vehicle 1 may directly receive the vehicle simulation data set from the server 212 without passing through the information processing terminal 12.

<Vehicle Simulation Processing>

Figure 11:
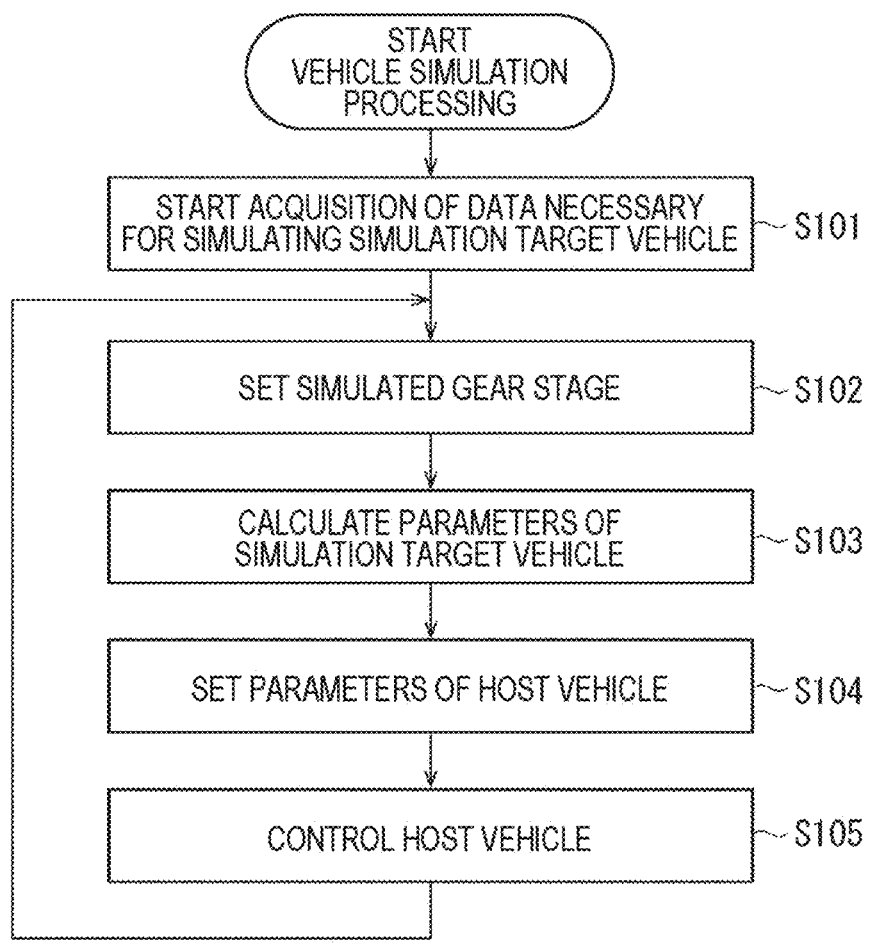
FIG. 11 is a flowchart for explaining vehicle simulation processing.

Next, vehicle simulation processing executed by the vehicle 1 will be described with reference to a flowchart of FIG. 11.

This processing is started, for example, when an operation for starting the vehicle 1 and starting driving is performed, for example, when an ignition switch, a power switch, a start switch, and the like of the vehicle 1 is turned on. Furthermore, this processing ends, for example, when an operation for ending driving of the vehicle 1 is performed, for example, when the ignition switch, the power switch, the start switch, and the like of the vehicle 1 is turned off.

Note that, it is assumed that the vehicle 1 has already acquired a vehicle simulation data set of a simulation target vehicle and a vehicle simulation program has been installed in each ECU.

Hereinafter, the vehicle 1 to be controlled for simulating the simulation target vehicle is also referred to as a host vehicle.

In step S101, the host vehicle starts acquisition of data necessary for simulating the simulation target vehicle. Specifically, the APS 311 starts processing of detecting an accelerator pedal opening and an accelerator pedal stepping speed and supplying AP data indicating a detection result to the driving ECU 252. The operation unit 312 starts processing of supplying an operation signal indicating operation contents to the driving ECU 252. The vehicle speed sensor 313 starts processing of detecting a speed of the host vehicle and supplying vehicle speed data indicating a detection result to the driving ECU 252.

In step S102, the simulated gear stage setting unit 321 sets a simulated gear stage.

Specifically, in a case where the simulation target vehicle is a manual transmission (MT) vehicle, the simulated gear stage setting unit 321 sets a simulated gear stage on the basis of the operation signal from the operation unit 312. That is, the simulated gear stage setting unit 321 switches the simulated gear stage or sets the simulated gear stage to neutral according to an operation of the operation unit 312 by a user (driver). Therefore, a manual shift of the simulation target vehicle is simulated.

On the other hand, in a case where the simulation target vehicle is an automatic transmission (AT) vehicle, the simulated gear stage setting unit 321 sets the simulated gear stage on the basis of the accelerator pedal opening, the vehicle speed of the host vehicle, and the operation signal from the operation unit 312. Specifically, the simulated gear stage setting unit 321 determines whether or not the simulated gear stage is set to neutral on the basis of the operation signal from the operation unit 312. In a case where the simulated gear stage is not set to neutral, the simulated gear stage setting unit 321 performs switching of the simulated gear stage (gear change) according to a predetermined shift logic.

Figure 12:
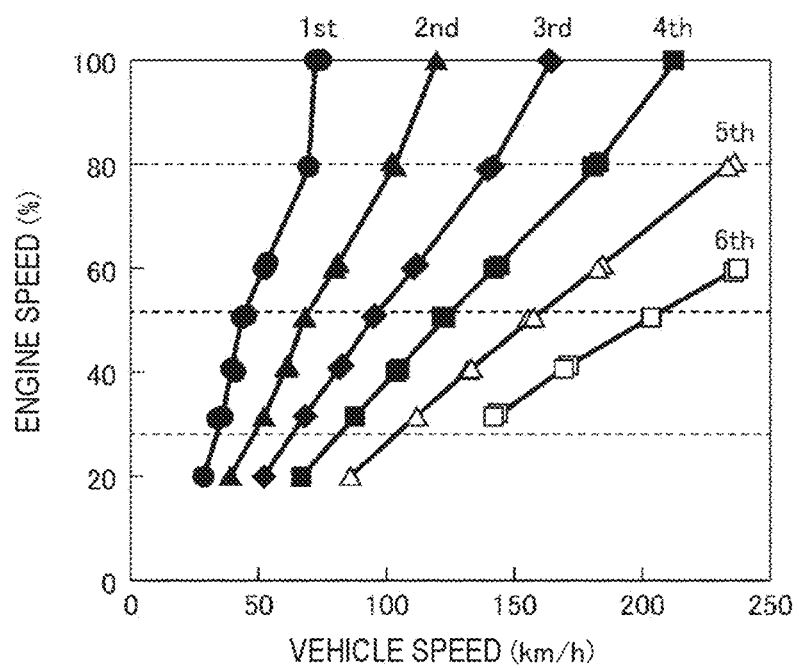
FIG. 12 is a graph showing an example of a relationship between a vehicle speed and an engine speed in each gear stage.

FIG. 12 is a graph showing an example of a relationship between a vehicle speed and an engine speed in each gear stage of the simulation target vehicle. In FIG. 12, the horizontal axis represents the vehicle speed (unit: km/h), and the vertical axis represents the engine speed (unit: %). Furthermore, each curve indicates a relationship between the vehicle speed and the engine speed in each gear stage from the first gear (1st) to the sixth gear (6th).

Normally, the shift logic of the AT vehicle is very complicated in consideration of fuel consumption and exhaust gas regulation. For example, the gear change is performed by a complicated logic so that fuel consumption and an exhaust gas amount become equal to or less than predetermined reference values on the basis of a gear stage-vehicle speed-engine speed characteristic in FIG. 12.

On the other hand, it is not very realistic to accurately reproduce the shift logic of the simulation target vehicle in the host vehicle from the viewpoint of cost and the like. Furthermore, since the host vehicle does not include an internal combustion engine, it is less necessary to complicate the shift logic in consideration of the fuel consumption and the exhaust gas regulation as in the simulation target vehicle.

Therefore, the simulated gear stage setting unit 321 performs a gear change according to the following simplified shift logic.

Note that, hereinafter, a simulated gear stage before the change is referred to as a current simulated gear stage.

For example, the simulated gear stage is raised according to the following shift logic.

In a case where the accelerator pedal opening is 50% or less, the simulated gear stage is raised by one stage when the vehicle speed of the host vehicle exceeds 50% of the maximum speed in the current simulated gear stage of the simulation target vehicle.

In a case where the accelerator pedal opening is more than 50% and 80% or less, when the vehicle speed of the host vehicle exceeds 50% to 80% of the maximum speed in the current simulated gear stage of the simulation target vehicle (this percentage is linked to the accelerator pedal opening), the simulated gear stage is raised by one stage.

In a case where the accelerator pedal opening exceeds 80%, when the vehicle speed of the host vehicle exceeds 80% of the maximum speed in the current simulated gear stage of the simulation target vehicle, the simulated gear stage is raised by one stage.

However, in any case, in a case where the current simulated gear stage is equal to the maximum gear stage of the simulation target vehicle, the simulated gear stage is not changed.

Furthermore, for example, the simulated gear stage is lowered according to the following shift logic.

When the vehicle speed of the host vehicle falls below 25% of the maximum speed in the current simulated gear stage of the simulation target vehicle, the simulated gear stage is lowered by one stage. However, in a case where the current simulated gear stage is the smallest, the simulated gear stage is not changed.

In this way, an automatic shift of the simulation target vehicle is simply simulated.

Note that, in a case where the accelerator pedal is rapidly stepped on at a speed equal to or greater than a predetermined threshold, kickdown is simulated. For example, in a case where the accelerator pedal opening changes from 50% or less to 80% or more within a predetermined time (for example, within 0.5 seconds), the simulated gear stage is lowered by one stage. After the kickdown is simulated, the simulated gear stage is changed by the above-described shift logic.

Furthermore, even in a case where the simulation target vehicle is an AT vehicle, the simulated gear stage may be able to be set on the basis of the operation signal from the operation unit 312 as in the case where the simulation target vehicle is an MT vehicle. In this case, for example, after a predetermined time (for example, 20 seconds) elapses from the gear change using the operation unit 312, the simulated gear stage is changed by the above-described shifting logic. However, in a case where the simulated gear stage is lowered using the operation unit 312, when a simulated engine speed (described later) exceeds a red zone of the simulation target vehicle (during over rev), the simulated gear stage is not changed.

Moreover, for example, in a case where there are models of both an MT car and an AT car in the simulation target vehicle, a method of gear change (gear shift) may be selected from a manual shift and an automatic shift. Note that, in order to prevent danger, a condition is provided for switching of the gear change method. For example, the gear change method can be switched only in a case where the host vehicle is stopped (P range).

In step S103, the parameter calculation unit 322 calculates parameters of the simulation target vehicle.

Specifically, the parameter calculation unit 322 detects whether or not the host vehicle is in an idling state on the basis of vehicle speed data and the like. In a case where the simulated gear stage is not set to neutral and the host vehicle is not in the idling state, the parameter calculation unit 322 calculates an engine speed (hereinafter referred to as a simulated engine speed) and a longitudinal acceleration of the simulation target vehicle corresponding to a current state of the host vehicle.

Specifically, the parameter calculation unit 322 calculates an engine speed in the reference gear stage on the basis of a change in accelerator pedal opening and a driving force characteristic (an accelerator pedal opening-engine speed-acceleration torque characteristic, or an accelerator pedal opening-engine speed-longitudinal acceleration characteristic) in the reference gear stage of the simulation target vehicle.

Next, the parameter calculation unit 322 calculates an engine speed (a simulated engine speed) of the simulation target vehicle in a set simulated gear stage by the following equation (1).

$$Rb = Gb/Ga \times Ra \qquad (1)$$

Ra represents an engine speed in the reference gear stage of the simulation target vehicle, Rb represents an engine speed (simulated engine speed) in the simulated gear stage of the simulation target vehicle, Ga represents a gear ratio in the reference gear stage of the simulation target vehicle, and Gb represents a gear ratio in the simulated gear stage of the simulation target vehicle.

Note that, in a case where the simulated engine speed exceeds the maximum engine speed in the simulated gear stage of the simulation target vehicle, the parameter calculation unit 322 corrects the simulated engine speed to the maximum engine speed or less (for example, the maximum engine speed).

Next, in a case where the accelerator pedal opening-engine speed-engine torque characteristic is included in the simulation data set, the parameter calculation unit 322 obtains an engine torque (hereinafter, referred to as a simulated engine torque) on the basis of the characteristic, the accelerator pedal opening, and the simulated engine speed.

Next, the parameter calculation unit 322 calculates a longitudinal acceleration of the simulation target vehicle on the basis of the simulated engine torque, the gear ratio in the simulated gear stage of the simulation target vehicle, a tire radius, and vehicle body weight.

On the other hand, in a case where the accelerator pedal opening-engine speed-longitudinal acceleration characteristic is included in the simulation data set, the parameter calculation unit 322 obtains a longitudinal acceleration of the simulation target vehicle on the basis of the characteristic, the accelerator pedal opening, and the simulated engine speed.

In this manner, the simulated engine speed and the longitudinal acceleration in a case where the characteristics of the simulation target vehicle are simulated are calculated.

On the other hand, in a case where the simulated gear stage is set to neutral, the parameter calculation unit 322 calculates a simulated engine speed on the basis of the accelerator pedal opening and the accelerator pedal opening-engine speed characteristic during neutral of the simulation target vehicle.

Furthermore, in a case where the host vehicle is in the idling state, the parameter calculation unit 322 sets the engine speed during idling of the simulation target vehicle as the simulated engine speed.

In step S104, the parameter setting unit 323 sets parameters of the host vehicle.

In a case where the simulated gear stage is not set to neutral and the host vehicle is not in the idling state, the parameter setting unit 323 calculates a torque of the EDU 317 necessary for realizing the longitudinal acceleration calculated in the processing of step S103 on the basis of weight, a tire radius, and a gear ratio of the host vehicle. Furthermore, the parameter setting unit 323 calculates a rotation speed of the EDU 317 on the basis of an accelerator pedal opening of the host vehicle.

Furthermore, in a case where the accelerator pedal is stepped on, the parameter setting unit 323 sets an engine speed increase reaction time as a reaction time of the EDU 317. In a case where the accelerator pedal is released, the parameter setting unit 323 sets an engine speed decrease reaction time as the reaction time of the EDU 317.

Moreover, in a case where it is the start of the host vehicle, the parameter setting unit 323 sets a start reaction time of the simulation target vehicle as a start reaction time of the host vehicle.

In a case where the simulated gear stage is set to neutral, the parameter setting unit 323 sets a simulated engine speed as the rotation speed of the EDU 317.

In a case where the host vehicle is in the idling state, the parameter setting unit 323 sets the simulated engine speed as the rotation speed of the EDU 317.

In step S105, the vehicle simulation system 301 controls the host vehicle.

For example, in a case where the simulated gear stage is not set to neutral and the host vehicle is not in an idling state, the drive control unit 324 controls the EDU 317 so as to achieve the rotation speed and the torque set by the parameter setting unit 323.

Furthermore, in a case where the accelerator pedal is stepped on, the drive control unit 324 increases the rotation speed of the EDU 317 by delaying the reaction time set by the parameter setting unit 323. On the other hand, in a case where the accelerator pedal is released, the drive control unit 324 delays the reaction time set by the parameter setting unit 323 to decrease the rotation speed of the EDU 317.

Moreover, in a case where it is the start of the host vehicle (in a case where the EDU 317 is not rotating), the drive control unit 324 delays the start reaction time set by the parameter setting unit 323 and starts rotation of the EDU 317.

For example, in a case where the simulated gear stage is set to neutral, the drive control unit 324 controls the EDU 317 so as to achieve the rotation speed set by the parameter setting unit 323.

For example, in a case where the host vehicle is in a neutral state, the drive control unit 324 controls the EDU 317 so as to achieve the rotation speed set by the parameter setting unit 323.

For example, the display control unit 331 causes the display unit 314 to display an image simulating the instrument panel of the simulation target vehicle on the basis of image data included in the vehicle simulation data set. For example, in a case where the simulation target vehicle includes a tachometer, an image including the tachometer is displayed on the display unit 314, and the rotation speed of the EDU 317 is displayed on the tachometer.

For example, the sound control unit 332 causes the sound output unit 315 to output an output sound simulating a sound of the internal combustion engine (for example, an engine sound) of the simulation target vehicle on the basis of sound data included in the vehicle simulation data set. At this time, the sound control unit 332 controls volume, frequency, and the like of the output sound on the basis of the simulated engine speed, for example.

For example, the vibration control unit 333 controls the vibration unit 316 to output vibration of the simulation target vehicle at the time of gear change. For example, haptic elements provided at portions with which a body of a user (driver) directly or indirectly touches, such as a steering wheel, a driver's seat, an accelerator pedal, and the like of the host vehicle, vibrate in accordance with the gear change. Therefore, a shift shock of the simulation target vehicle is simulated.

Here, the vibration at the time of gear change is not necessarily strictly simulated. On the other hand, for example, a reaction speed from when the user performs a gear change operation until the vibration is started is controlled according to a gear change speed of the simulation target vehicle. For example, in a case where the simulation target vehicle includes a high-speed transmission such as a dual clutch transmission (DCT) and the like, the reaction speed is increased. On the other hand, in a case where the simulation target vehicle does not include the high-speed transmission, the reaction speed is delayed.

Thereafter, the processing returns to step S102, and the processing of steps S102 to S105 is repeatedly executed.

As described above, the characteristics of the simulation target vehicle can be simulated in the vehicle 1. For example, the engine torque characteristic and the multistage gear characteristic of the simulation target vehicle are simulated using the characteristic that the torque in the low rotation range of the EDU 317 is large. Therefore, while driving the vehicle 1 that is a non-internal combustion engine vehicle that does not include a multistage transmission mechanism, a user can experience a traveling feeling as if driving the simulation target vehicle that is an internal combustion engine vehicle by a sense of torque of the vehicle 1, a sense of operation of the gear stage, and the like.

Furthermore, since not only the traveling characteristics of the simulation target vehicle but also the instrument panel, the engine sound, and the vibration of the transmission shock are simulated, the user can more realistically experience the traveling feeling of the simulation target vehicle.

Therefore, it is possible to improve a degree of satisfaction of the user who likes the traveling feeling of the internal combustion engine vehicle.

Moreover, since the vehicle simulation data set includes only the driving force characteristic in the reference gear stage, a load and cost required for generating the vehicle simulation data set can be reduced. Furthermore, even if only the driving force characteristic in the reference gear stage is included, the driving force characteristic in the other gear stage can be calculated on the basis of the gear ratio in each gear stage, so that the characteristics of the simulation target vehicle can be almost accurately simulated.

Furthermore, the user can experience traveling feelings of a plurality of different vehicles in the same vehicle 1 by exchanging the vehicle simulation data set.

Moreover, by processing or creating the vehicle simulation data set, the user can realize a traveling feeling closer to his/her own preference.

3. Modifications

Hereinafter, modifications of the above-described embodiment of the present technology will be described.

The present technology can also be applied to a case where a characteristic of an internal combustion engine vehicle is simulated using an internal combustion engine other than an engine as a power source. Furthermore, the present technology can also be applied to a case where the characteristic of the internal combustion engine vehicle is simulated in a non-internal combustion engine vehicle using a non-internal combustion engine other than an electric motor as a power source.

For example, a vehicle simulation data set may be provided by a subscription service. For example, a user can obtain and use a vehicle simulation data set of a plurality of different simulation target vehicles by paying a predetermined fee every month and subscribing to a subscription service.

Note that the number of vehicle simulation data sets that can be used may or may not be limited. In a case where the number of vehicle simulation data sets that can be used is limited, for example, the number of vehicle simulation data sets that can be used within a predetermined period may be differentiated by a contract plan and the like.

Furthermore, for example, the vehicle simulation data set may be associated with the vehicle 1 or may be associated with the user. In the former case, the vehicle 1 that can use the vehicle simulation data set is limited. On the other hand, in the latter case, the vehicle 1 that can use the vehicle simulation data set is not limited. For example, even in a case where the user drives a vehicle other than a vehicle owned by the user (for example, a shared car, a rental car, and the like), the characteristic of the simulation target vehicle can be simulated using the vehicle simulation data set owned by the user by performing user authentication and the like.

4. Others

The series of processing described above can be executed by hardware or software. In a case where the series of processing is executed by software, a program constituting the software is installed on a computer (for example, the communication ECU 251, the driving ECU 252, the HMI ECU 253, and the like). Here, the computer includes a computer incorporated in dedicated hardware, a general-purpose computer capable of executing various functions by installing various programs, and the like, for example.

The program executed by the computer can be provided by recording on a removable medium as a package medium and the like, for example. Furthermore, the program can be provided via a wired or wireless transmission medium (for example, the network 221) such as a local area network, the Internet, or digital satellite broadcasting.

Note that the program executed by the computer may be a program in which processing is performed in time series in the order described in the present specification, or may be a program in which processing is performed in parallel or at necessary timing such as when a call is made, and the like.

Furthermore, in the present specification, the system means a set of a plurality of components (devices, modules (parts), and the like), and it does not matter whether or not all the components are in the same housing. Therefore, a plurality of devices housed in separate housings and connected via a network, and one device housing a plurality of modules in one housing are both systems.

Moreover, an embodiment of the present technology is not limited to the above-described embodiment, and various modifications can be made without departing from the scope of the present technology.

For example, the present technology can be configured as cloud computing in which one function is shared and jointly processed by a plurality of devices via a network.

Furthermore, each step described in the above-described flowcharts can be executed by one device or shared and executed by a plurality of devices.

Moreover, in a case where one step includes a plurality of processing, the plurality of processing included in the one step can be executed by one device or shared and executed by a plurality of devices.

<Combination Example of Configurations>

Note that the present technology can have the following configurations.

(1)
An information processing apparatus including:
a parameter calculation unit that calculates, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source;
a parameter setting unit that sets a second parameter related to the non-internal combustion engine on the basis of the first parameter; and
a drive control unit that controls the non-internal combustion engine on the basis of the second parameter.

(2)
The information processing apparatus according to (1), in which
the parameter calculation unit calculates the first parameter on the basis of the driving force characteristic, and a first gear ratio in the reference gear stage and a second gear ratio in the simulated gear stage of the simulation target vehicle.

(3)
The information processing apparatus according to (2), in which
the first parameter includes a rotation speed of the internal combustion engine in the simulated gear stage, and
the second parameter includes a rotation speed and a torque of the non-internal combustion engine.

(4)
The information processing apparatus according to (3), in which
the driving force characteristic includes a characteristic indicating a relationship among an accelerator pedal opening in the reference gear stage of the simulation target vehicle, a rotation speed of the internal combustion engine, and a torque of the internal combustion engine,
the parameter calculation unit calculates the rotation speed and the torque of the internal combustion engine in the simulated gear stage on the basis of the driving force characteristic, the first gear ratio, the second gear ratio, and an accelerator pedal opening of the control target vehicle, and
the parameter setting unit sets the rotation speed and the torque of the non-internal combustion engine on the basis of the accelerator pedal opening of the control target vehicle and the torque of the internal combustion engine in the simulated gear stage.

(5)
The information processing apparatus according to (3), in which
the driving force characteristic includes a characteristic indicating a relationship among an accelerator pedal opening in the reference gear stage of the simulation target vehicle, a rotation speed of the internal combustion engine, and a longitudinal acceleration of the simulation target vehicle,
the parameter calculation unit calculates the rotation speed of the internal combustion engine and the longitudinal acceleration of the simulation target vehicle in the simulated gear stage on the basis of the driving force characteristic, the first gear ratio, the second gear ratio, and an accelerator pedal opening of the control target vehicle, and
the parameter setting unit sets the rotation speed and the torque of the non-internal combustion engine on the basis of the accelerator pedal opening of the control target vehicle and the longitudinal acceleration of the simulation target vehicle in the simulated gear stage.

(6)
The information processing apparatus according to any one of (3) to (5), in which
the parameter setting unit sets a reaction time of the rotation speed of the non-internal combustion engine with respect to an operation of an accelerator pedal of the control target vehicle on the basis of a reaction time of the rotation speed of the internal combustion engine with respect to an operation of an accelerator pedal of the simulation target vehicle, and
the drive control unit controls the non-internal combustion engine on the basis of the set reaction time.

(7)
The information processing apparatus according to any one of (3) to (6), in which
in a case where the calculated rotation speed of the internal combustion engine in the simulated gear stage exceeds a maximum rotation speed of the internal combustion engine in the simulated gear stage of the simulation target vehicle, the parameter calculation unit corrects the rotation speed of the internal combustion engine in the simulated gear stage to the maximum rotation speed or less.

(8)
The information processing apparatus according to any one of (3) to (7), further including:
a sound control unit that controls an output of an output sound simulating a sound of the internal combustion engine on the basis of the rotation speed of the internal combustion engine in the simulated gear stage.

(9)
The information processing apparatus according to any one of (1) to (8), further including:
a simulated gear stage setting unit that sets the simulated gear stage on the basis of an operation signal from an operation unit included in the control target vehicle.

(10)
The information processing apparatus according to (9), in which
the simulated gear stage setting unit switches the simulated gear stage on the basis of an accelerator pedal opening of the control target vehicle, a maximum speed of the simulation target vehicle in the simulated gear stage, and a speed of the control target vehicle.

(11)
The information processing apparatus according to (10), in which
in a case where an accelerator pedal of the control target vehicle is stepped on at a speed equal to or higher than a predetermined threshold, the simulated gear stage setting unit lowers the simulated gear stage.

(12)
The information processing apparatus according to any one of (1) to (11), in which
in a case where the simulated gear stage of the control target vehicle is set to neutral, the parameter setting unit sets a rotation speed of the non-internal combustion engine on the basis of a rotation speed of the internal combustion engine in a case where a gear stage of the simulation target vehicle is set to neutral, and the drive control unit controls the non-internal combustion engine on the basis of the rotation speed set by the parameter setting unit.

(13)
The information processing apparatus according to any one of (1) to (12), in which
in a case where the control target vehicle is in an idling state, the parameter setting unit sets a rotation speed of the non-internal combustion engine on the basis of a rotation speed of the internal combustion engine during idling of the simulation target vehicle, and the drive control unit controls the non-internal combustion engine on the basis of the rotation speed set by the parameter setting unit.

(14)
The information processing apparatus according to any one of (1) to (13), further including:
a vibration control unit that controls vibration of the control target vehicle during switching of the simulated gear stage.

(15)
The information processing apparatus according to any one of (1) to (14), in which
the simulation target vehicle is an existing vehicle, and
the driving force characteristic is a characteristic based on a measured value in the simulation target vehicle.

(16)

The information processing apparatus according to any one of (1) to (14), in which
the simulation target vehicle is an imaginary vehicle, and
the driving force characteristic is a created characteristic.

(17)

The information processing apparatus according to any one of (1) to (16), further including:
a communication control unit that controls reception of a data set including the driving force characteristic from another information processing apparatus, in which
the parameter calculation unit calculates the first parameter on the basis of the driving force characteristic included in the received data set.

(18)

The information processing apparatus according to any one of (1) to (17), in which
the internal combustion engine is an engine, and
the non-internal combustion engine is an electric motor.

(19)

An information processing method including:
calculating, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source;
setting a second parameter related to the non-internal combustion engine on the basis of the first parameter; and
controlling the non-internal combustion engine on the basis of the second parameter.

(20)

A program for causing a computer to execute processing of:
calculating, on the basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source;
setting a second parameter related to the non-internal combustion engine on the basis of the first parameter; and
controlling the non-internal combustion engine on the basis of the second parameter.

Note that the effects described in the present specification are merely examples and are not limited, and there may be other effects.

REFERENCE SIGNS LIST 1, 1-1 to 1-$n$ Vehicle
27 Vehicle sensor
31 HMI
32 Vehicle control unit
83 Drive control unit
201 Information processing system
211-1 to 211-$n$ Information processing terminal
212 Server
251 Communication ECU
252 Driving ECU
253 HMI ECU
311 APS
312 Operation unit
313 Vehicle speed sensor
314 Display unit
315 Sound output unit
316 Vibration unit
317 EDU
321 Simulated gear stage setting unit
322 Parameter calculation unit
323 Parameter conversion unit
324 Drive control unit
331 Display control unit
332 Sound control unit
333 Vibration control unit

The invention claimed is:

1. An information processing apparatus comprising:
circuitry including a processor that is configured to
calculate, on a basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source, the first parameter including a rotation speed of the internal combustion engine in the simulated gear stage,
set a second parameter related to the non-internal combustion engine on a basis of the first parameter, the second parameter including a rotation speed and a torque of the non-internal combustion engine, and
control the non-internal combustion engine on a basis of the second parameter, wherein
the circuitry is further configured to
calculate the first parameter further on a basis of a first gear ratio in the predetermined reference gear stage and a second gear ratio in the simulated gear stage of the simulation target vehicle,
set a reaction time of the rotation speed of the non-internal combustion engine with respect to an operation of an accelerator pedal of the control target vehicle on a basis of a reaction time of the rotation speed of the internal combustion engine with respect to an operation of an accelerator pedal of the simulation target vehicle, and
control the non-internal combustion engine on a basis of the reaction time that was set.

2. The information processing apparatus according to claim 1, wherein
the driving force characteristic includes a characteristic indicating a relationship among an accelerator pedal opening, a rotation speed of the internal combustion engine, and a torque of the internal combustion engine, in the predetermined reference gear stage of the simulation target vehicle, and
the circuitry is further configured to
calculate the rotation speed and the torque of the internal combustion engine in the simulated gear stage on a basis of the driving force characteristic, the first gear ratio, the second gear ratio, and an accelerator pedal opening of the control target vehicle, and
set the rotation speed and the torque of the non-internal combustion engine on a basis of the accelerator pedal opening of the control target vehicle and the torque of the internal combustion engine in the simulated gear stage.

3. The information processing apparatus according to claim 1, wherein
the driving force characteristic includes a characteristic indicating a relationship among an accelerator pedal opening, a rotation speed of the internal combustion engine, and a longitudinal acceleration of the simulation target vehicle, in the predetermined reference gear stage of the simulation target vehicle, and
the circuitry is further configured to
calculate the rotation speed of the internal combustion engine and the longitudinal acceleration of the simulation target vehicle in the simulated gear stage on a basis of the driving force characteristic, the first gear ratio, the second gear ratio, and an accelerator pedal opening of the control target vehicle, and
set the rotation speed and the torque of the non-internal combustion engine on a basis of the accelerator pedal opening of the control target vehicle and the longitudinal acceleration of the simulation target vehicle in the simulated gear stage.

4. The information processing apparatus according to claim 1, wherein
in a case where the rotation speed of the internal combustion engine in the simulated gear stage exceeds a maximum rotation speed of the internal combustion engine in the simulated gear stage of the simulation target vehicle, the circuitry is further configured to correct the rotation speed of the internal combustion engine in the simulated gear stage to the maximum rotation speed or less.

5. The information processing apparatus according to claim 1, wherein
the circuitry is further configured to control an output of an output sound simulating a sound of the internal combustion engine on a basis of the rotation speed of the internal combustion engine in the simulated gear stage.

6. The information processing apparatus according to claim 1, wherein
the circuitry is further configured to set the simulated gear stage on a basis of an operation signal from an operation unit included in the control target vehicle.

7. The information processing apparatus according to claim 6, wherein
the circuitry is further configured to switch the simulated gear stage on a basis of an accelerator pedal opening of the control target vehicle, a maximum speed of the simulation target vehicle in the simulated gear stage, and a speed of the control target vehicle.

8. The information processing apparatus according to claim 7, wherein
in a case where an accelerator pedal of the control target vehicle is stepped on at a speed equal to or higher than a predetermined threshold, the circuitry is further configured to lower the simulated gear stage.

9. The information processing apparatus according to claim 1, wherein
in a case where the simulated gear stage of the control target vehicle is set to neutral, the circuitry is further configured to
set a rotation speed of the non-internal combustion engine on a basis of a rotation speed of the internal combustion engine in a case where a gear stage of the simulation target vehicle is set to neutral, and control the non-internal combustion engine on a basis of the rotation speed that was set.

10. The information processing apparatus according to claim 1, wherein
in a case where the control target vehicle is in an idling state, the circuitry is further configured to
set a rotation speed of the non-internal combustion engine on a basis of a rotation speed of the internal combustion engine during idling of the simulation target vehicle, and
control the non-internal combustion engine on a basis of the rotation speed that was set.

11. The information processing apparatus according to claim 1, wherein
the circuitry is further configured to control vibration of the control target vehicle during switching of the simulated gear stage.

12. The information processing apparatus according to claim 1, wherein
the simulation target vehicle is an existing vehicle, and
the driving force characteristic is a characteristic based on a measured value in the simulation target vehicle.

13. The information processing apparatus according to claim 1, wherein
the simulation target vehicle is an imaginary vehicle, and
the driving force characteristic is a created characteristic.

14. The information processing apparatus according to claim 1, wherein
the circuitry is further configured to
control reception of a data set including the driving force characteristic from another information processing apparatus, and
calculate the first parameter on a basis of the driving force characteristic included in the received data set.

15. The information processing apparatus according to claim 1, wherein
the internal combustion engine is an engine, and
the non-internal combustion engine is an electric motor.

16. An information processing method comprising:
calculating, on a basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source;
setting a second parameter related to the non-internal combustion engine on a basis of the first parameter;
controlling the non-internal combustion engine on a basis of the second parameter; and
in a case where the simulated gear stage of the control target vehicle is set to neutral, setting a rotation speed of the non-internal combustion engine on a basis of a rotation speed of the internal combustion engine in a case where a gear stage of the simulation target vehicle is set to neutral, and controlling the non-internal combustion engine on a basis of the rotation speed that was set.

17. A non-transitory computer-readable storage medium storing a program for causing a computer to execute processing of:
calculating, on a basis of a driving force characteristic in a predetermined reference gear stage of a simulation target vehicle to be simulated using an internal combustion engine as a power source, a first parameter related to the internal combustion engine in a simulated gear stage that is a simulative gear stage in a control target vehicle to be controlled using a non-internal combustion engine as a power source;

setting a second parameter related to the non-internal combustion engine on a basis of the first parameter;

controlling the non-internal combustion engine on a basis of the second parameter; and in a case where the control target vehicle is in an idling state, setting a rotation speed of the non-internal combustion engine on a basis of a rotation speed of the internal combustion engine during idling of the simulation target vehicle, and controlling the non-internal combustion engine on a basis of the rotation speed that was set.

* * * * *